(12) United States Patent
Shrivastava

(10) Patent No.: US 12,439,475 B2
(45) Date of Patent: Oct. 7, 2025

(54) METHODS AND USER EQUIPMENT (UE) FOR HANDLING MBS SERVICE IN WIRELESS NETWORK

(71) Applicant: Samsung Electronics Co., Ltd., Gyeonggi-do (KR)

(72) Inventor: Vinay Kumar Shrivastava, Bangalore (IN)

(73) Assignee: Samsung Electronics Co., Ltd., Seoul (KR)

( * ) Notice: Subject to any disclaimer, the term of this patent is extended or adjusted under 35 U.S.C. 154(b) by 319 days.

(21) Appl. No.: 18/009,904

(22) PCT Filed: Mar. 30, 2022

(86) PCT No.: PCT/KR2022/004524
§ 371 (c)(1),
(2) Date: Dec. 12, 2022

(87) PCT Pub. No.: WO2022/211499
PCT Pub. Date: Oct. 6, 2022

(65) Prior Publication Data
US 2023/0269828 A1 Aug. 24, 2023

(30) Foreign Application Priority Data

Mar. 30, 2021 (IN) .............................. 202141014450
Mar. 22, 2022 (IN) .............................. 202141014450

(51) Int. Cl.
*H04W 76/40* (2018.01)
*H04W 48/08* (2009.01)
(Continued)

(52) U.S. Cl.
CPC ........... *H04W 76/40* (2018.02); *H04W 48/08* (2013.01); *H04W 76/28* (2018.02); *H04W 76/30* (2018.02)

(58) Field of Classification Search
CPC ..... H04W 76/40; H04W 76/28; H04W 76/30; H04W 48/08; H04W 48/12; H04W 72/30; H04W 4/06; H04W 36/0007
See application file for complete search history.

(56) References Cited

U.S. PATENT DOCUMENTS

2022/0124675 A1* 4/2022 Liu .................... H04W 72/56
2022/0338291 A1 10/2022 Hong
(Continued)

FOREIGN PATENT DOCUMENTS

WO    WO 2021/035751    3/2021
WO    WO 2021/054674    3/2021

OTHER PUBLICATIONS

PCT/ISA/210 Search Report issued on PCT/KR2022/004524, Jun. 30, 2022 pp. 3.
(Continued)

*Primary Examiner* — Robert C Scheibel
(74) *Attorney, Agent, or Firm* — The Farrell Law Firm, P.C.

(57) ABSTRACT

The disclosure relates to a 5G or 6G communication system for supporting a higher data transmission rate. Embodiments herein disclose methods for handling a MBS service in a wireless network (400) by a UE (100). The method includes receiving a MCCH configuration and at least one parameter associated with the MCCH configuration in a SIB. Further, the method includes configuring a MCCH channel based on the MCCH configuration and the parameter associated with the MCCH configuration. Further, the method includes receiving a MCCH information message through the MCCH channel. Further, the method includes configuring at least one MTCH based on the MCCH information message. Further, the method includes receiving the MBS service through the MTCH.

16 Claims, 14 Drawing Sheets

(51) Int. Cl.
  *H04W 76/28* (2018.01)
  *H04W 76/30* (2018.01)

(56) References Cited

U.S. PATENT DOCUMENTS

| | | | | |
|---|---|---|---|---|
| 2023/0209465 A1* | 6/2023 | Zhou | H04W 72/30 | 370/311 |
| 2023/0209532 A1* | 6/2023 | Zhou | H04W 72/121 | |
| 2023/0283438 A1* | 9/2023 | Zhang | H04L 5/0053 | 370/329 |
| 2023/0309185 A1* | 9/2023 | Hori | H04W 76/30 | |
| 2023/0362960 A1* | 11/2023 | Adjakple | H04W 4/08 | |
| 2023/0396367 A1* | 12/2023 | Hori | H04W 72/30 | |
| 2024/0032070 A1* | 1/2024 | Zhou | H04W 72/30 | |
| 2024/0032148 A1* | 1/2024 | Fujishiro | H04W 76/40 | |
| 2024/0063965 A1* | 2/2024 | Babaei | H04L 5/0048 | |

OTHER PUBLICATIONS

PCT/ISA/237 Written Opinion issued on PCT/KR2022/004524, Jun. 30, 2022, pp. 4.
Examination Report dated Nov. 18, 2022 issue in counterpart Application No. IN 202141014450, pp. 6.
Kyocera, "Further consideration of control plane aspects for NR MBS", R2-2100803, 3GPP TSG RAN WG2 #113-e, Jan. 14, 2021, pp. 10.
Nokia et al., "MBS Idle", R2-2101080, 3GPP TSG RAN WG2 Meeting #113-e, Jan. 15, 2021, pp. 7.
Futurewei, "Discussion on NR MBS solutions of mode 2 delivery", R2-2100631, 3GPP TSG RAN WG 2 #113-e, Jan. 15, 2021, pp. 7.
Oppo, "Discussion on MBS reception of idle or inactive mode UE", R2-2008869, 3GPP TSG RAN WG2 Meeting #112-e, Oct. 23, 2020, pp. 6.
Kyocera, "Further consideration of control plane aspects for NR MBS"; 3GPP Draft; R2-2100803, Feb. 5, 2021, pp. 8.
Huawei, HiSilicon, "Idle/Inactive UE Support for NR MBS", R2-2007029, 3GPP TSG-RAN WG2 Meeting #111-e, Aug. 17-28, 2020, 6 pages.
Samsung, "On Stage-2 Aspects and Overview of NR MBS", R2-2010064, 3GPP TSG RAN WG2 Meeting #112-e, Nov. 2-13, 2020, 5 pages.
European Search Report dated Sep. 15, 2023 issue in counterpart Application No. 22781618.8-1215, 15 pages.
Chinese Office Action dated Apr. 25, 2025 issue in counterpart Application No. 202280005408.0, 25 pages.
EP Communication Report dated Jul. 18, 2025 issue in counterpart Application No. 22781618.8-1206, 11 pages.

* cited by examiner

[Fig. 1a]
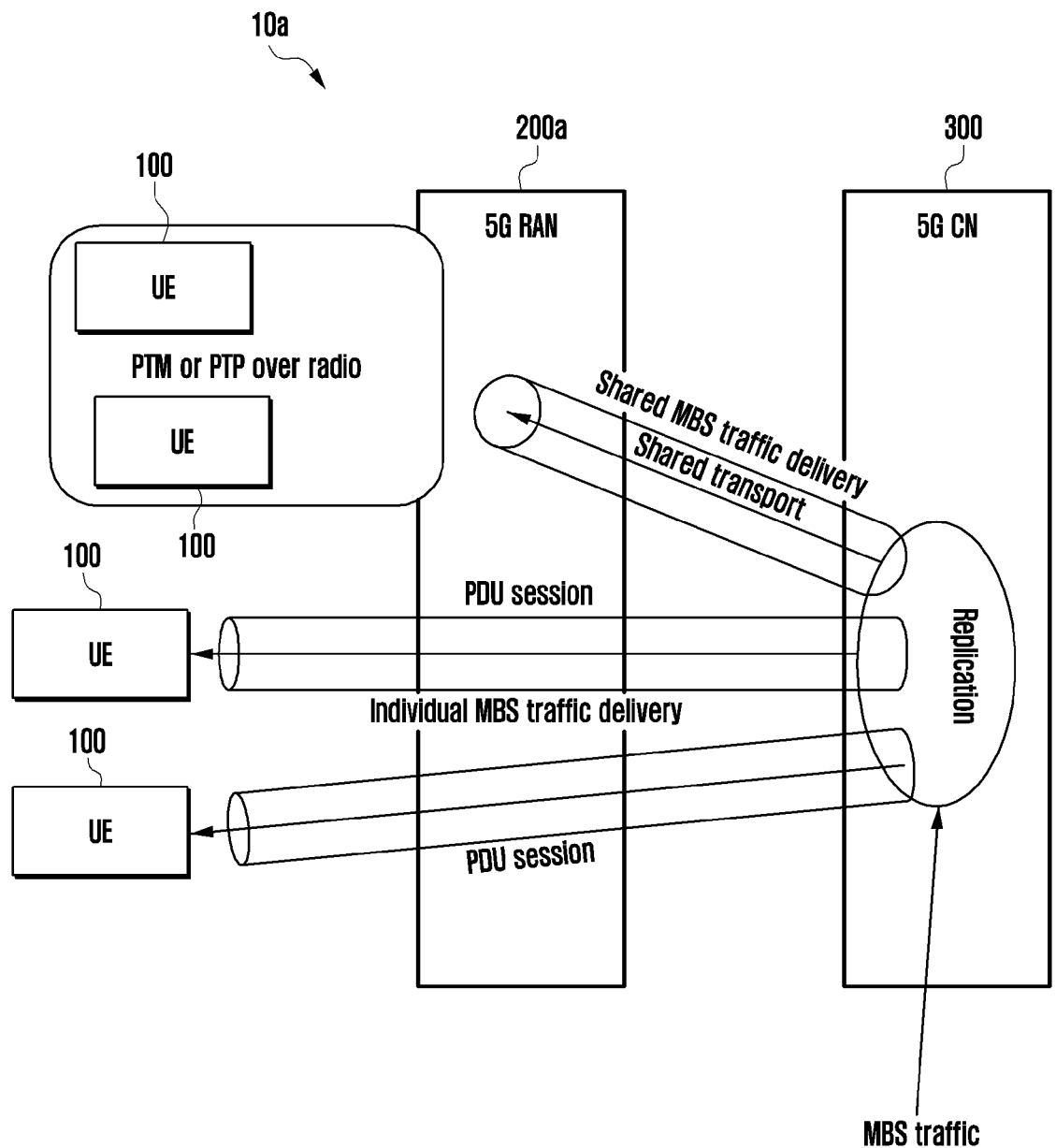

[Fig. 1b]
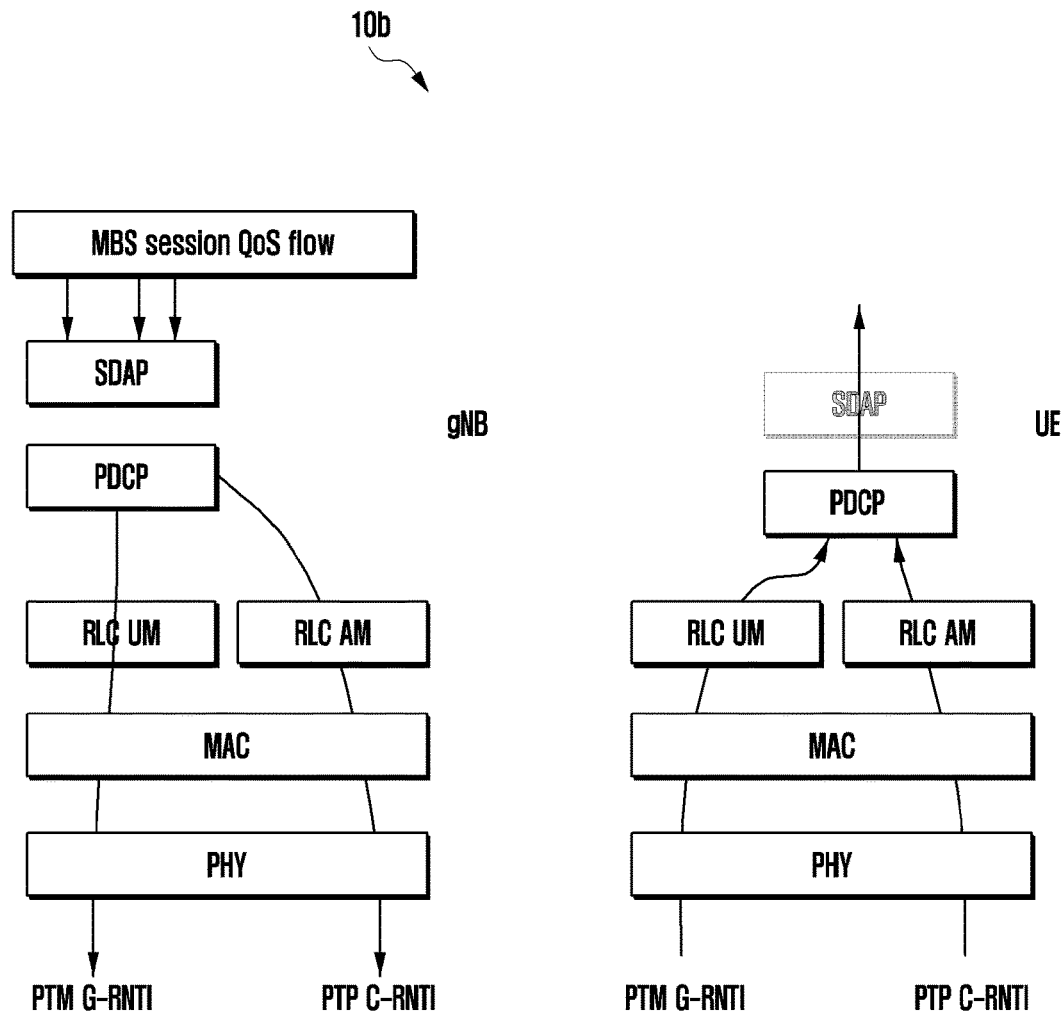
[Fig. 1c]
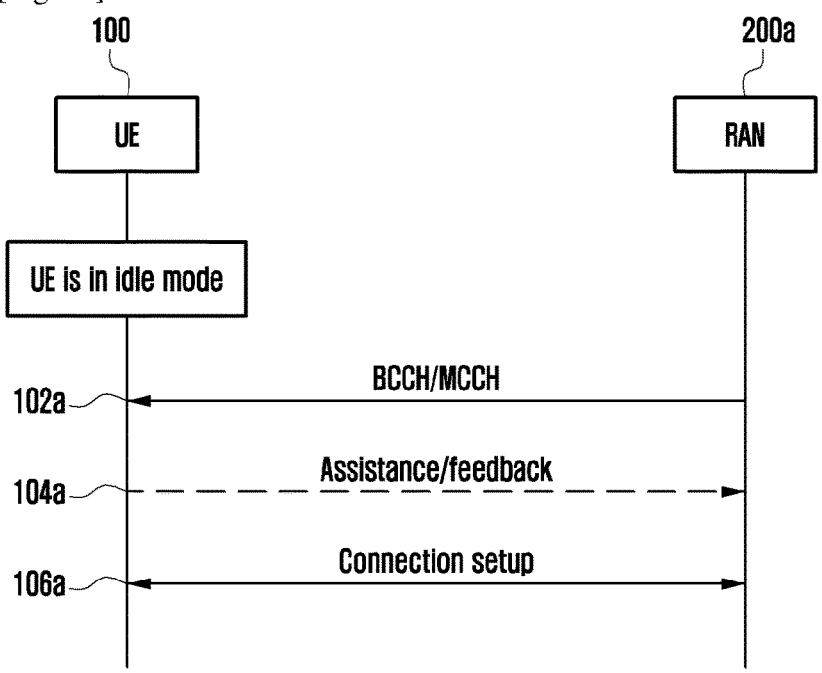

[Fig. 1d]
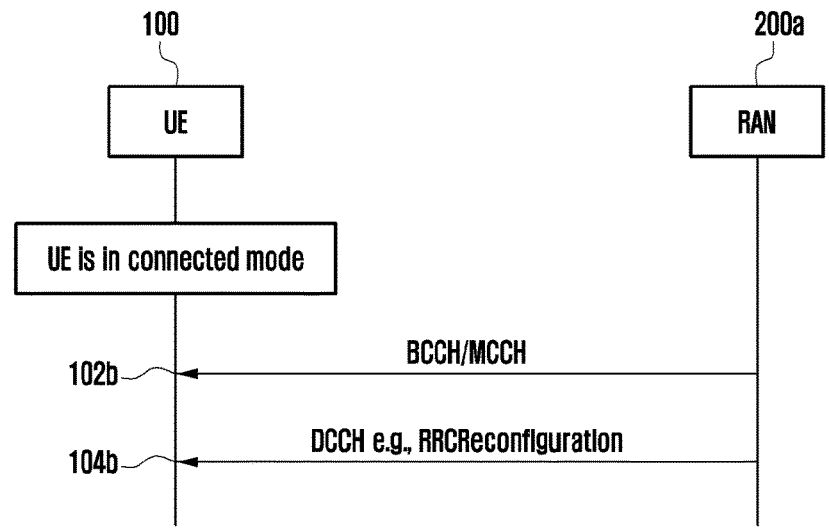
[Fig. 2]
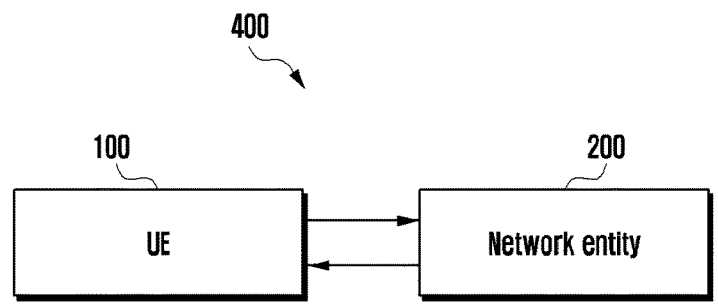
[Fig. 3]
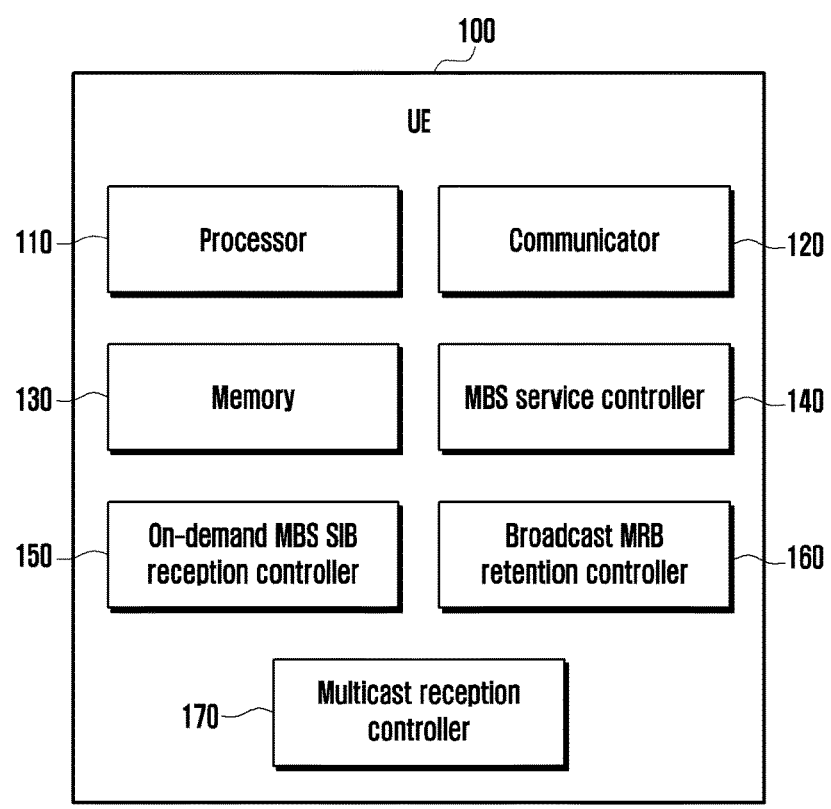

[Fig. 4]
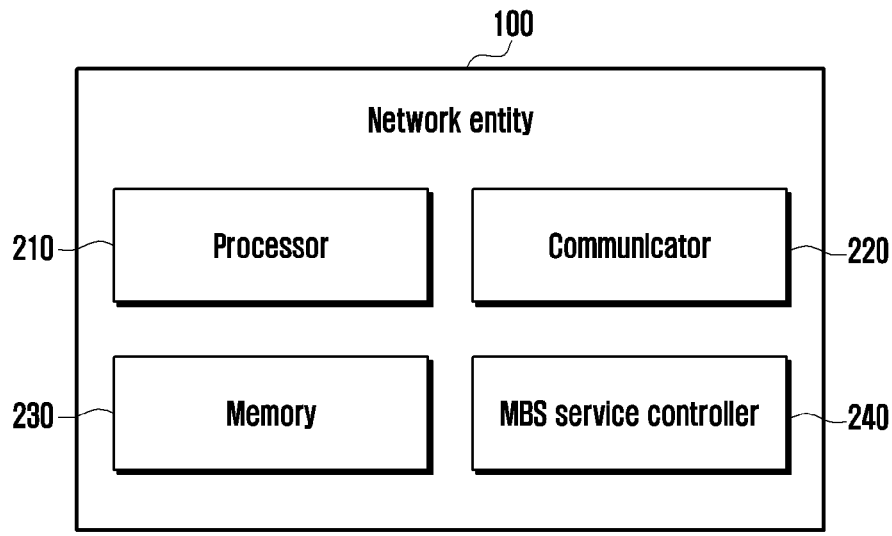
[Fig. 5]
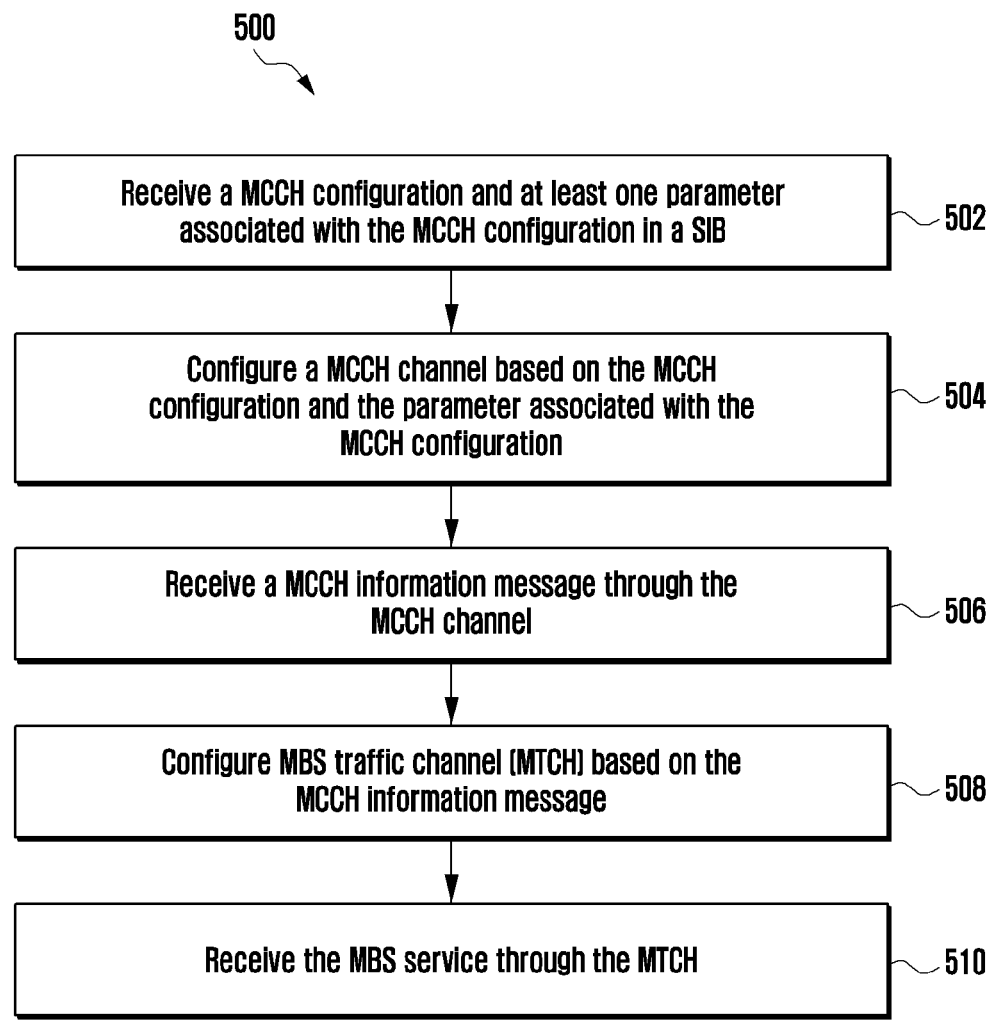

[Fig. 6]
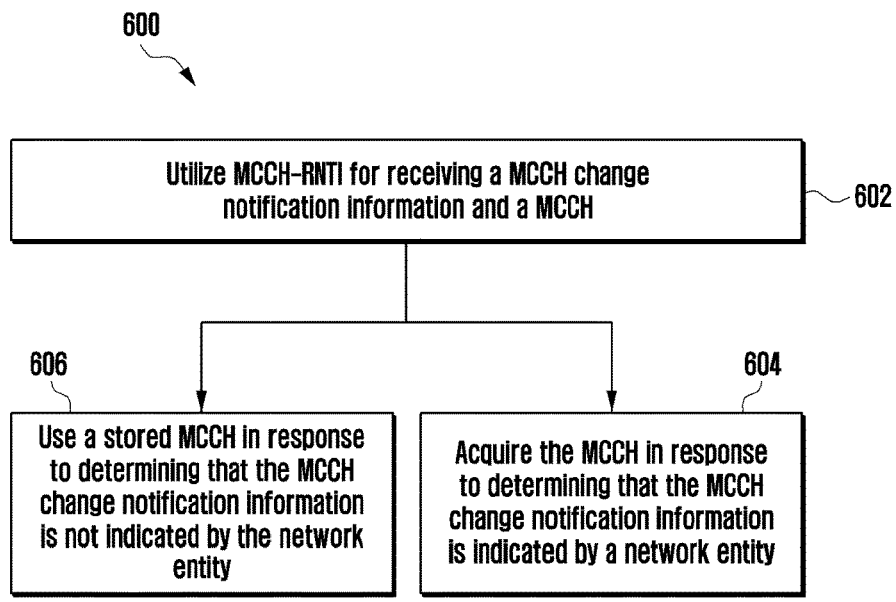
[Fig. 7]
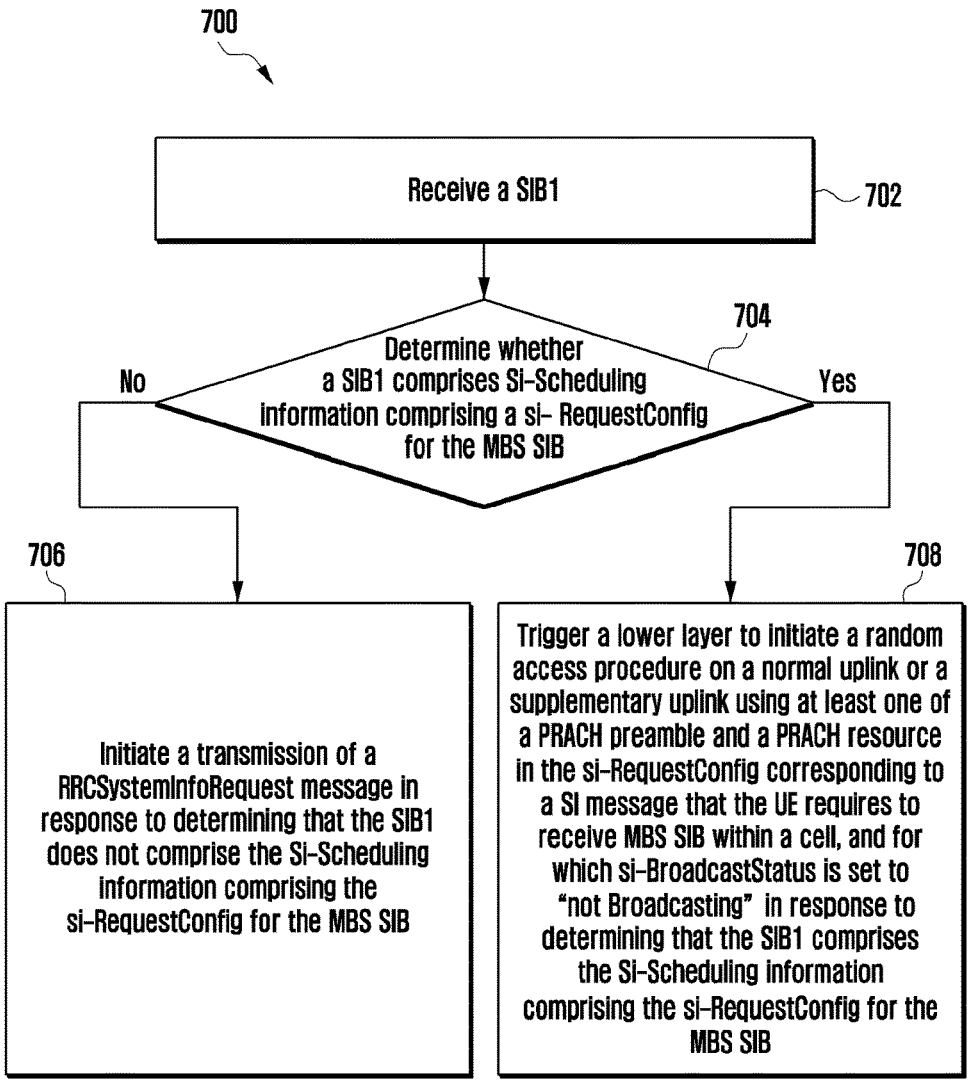

[Fig. 8]
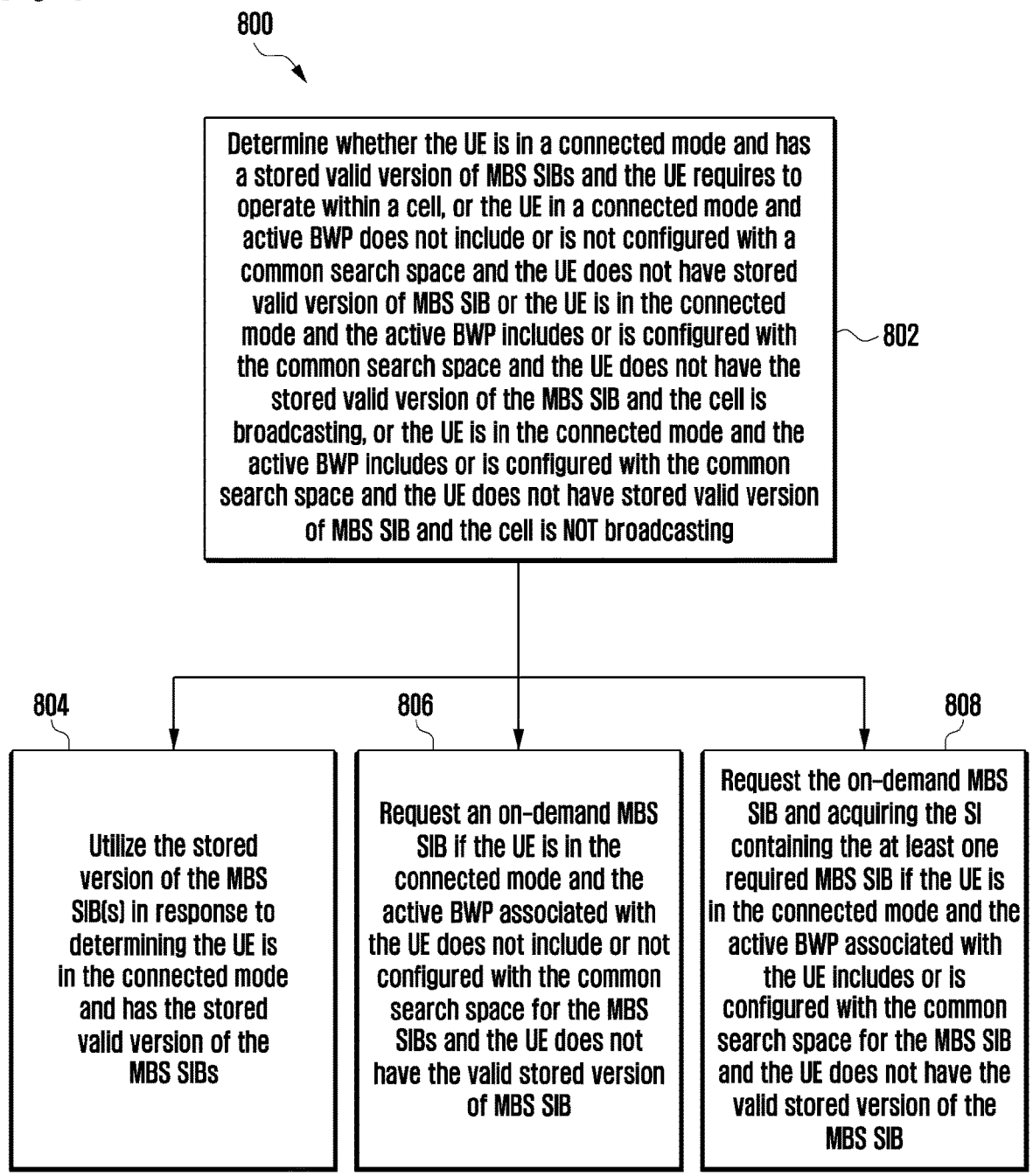

[Fig. 9a]
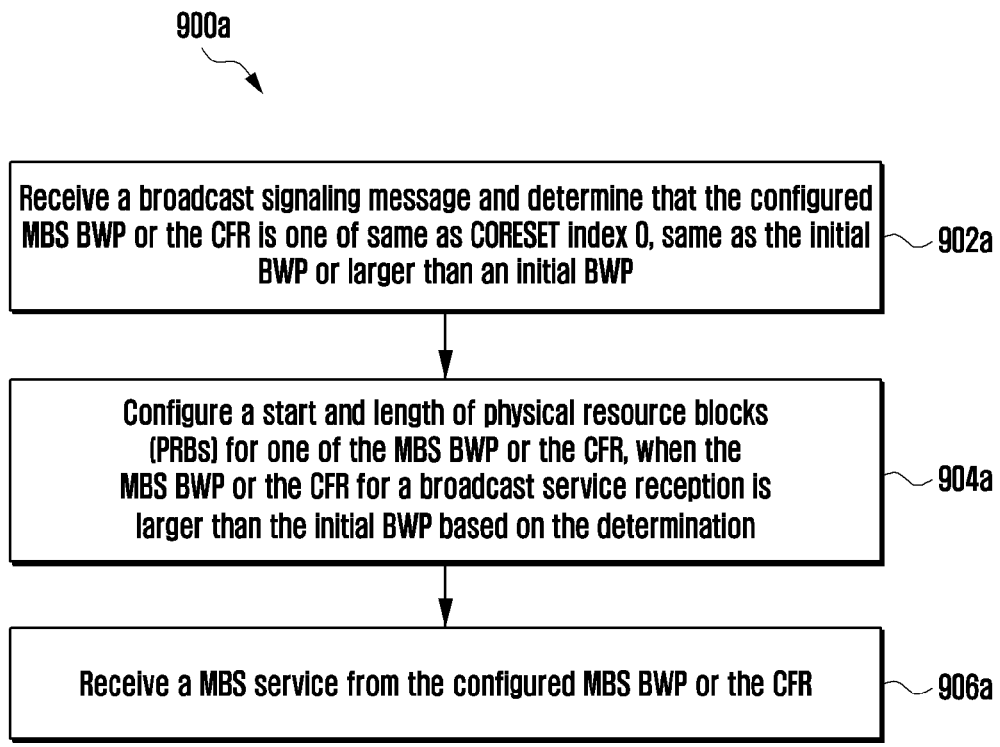
[Fig. 9b]
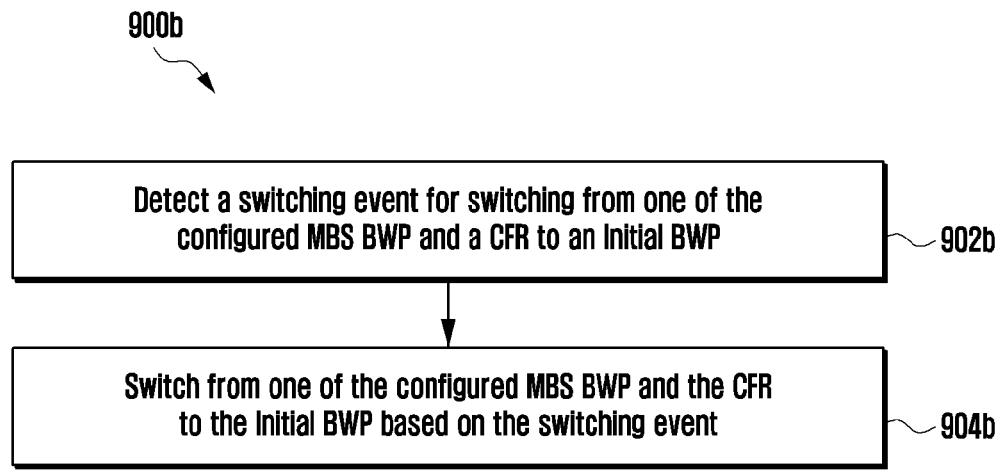

[Fig. 10]
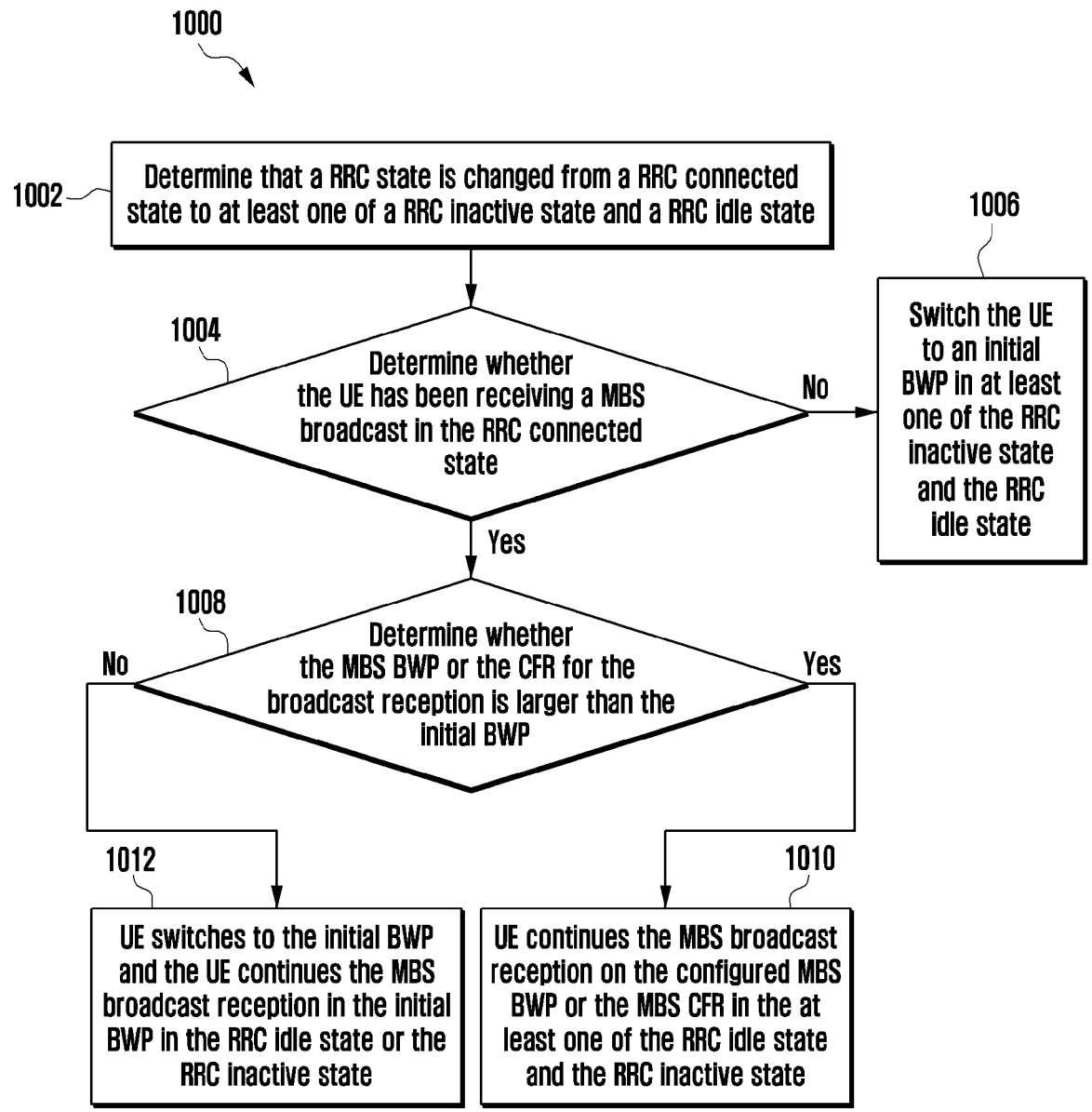

[Fig. 11]
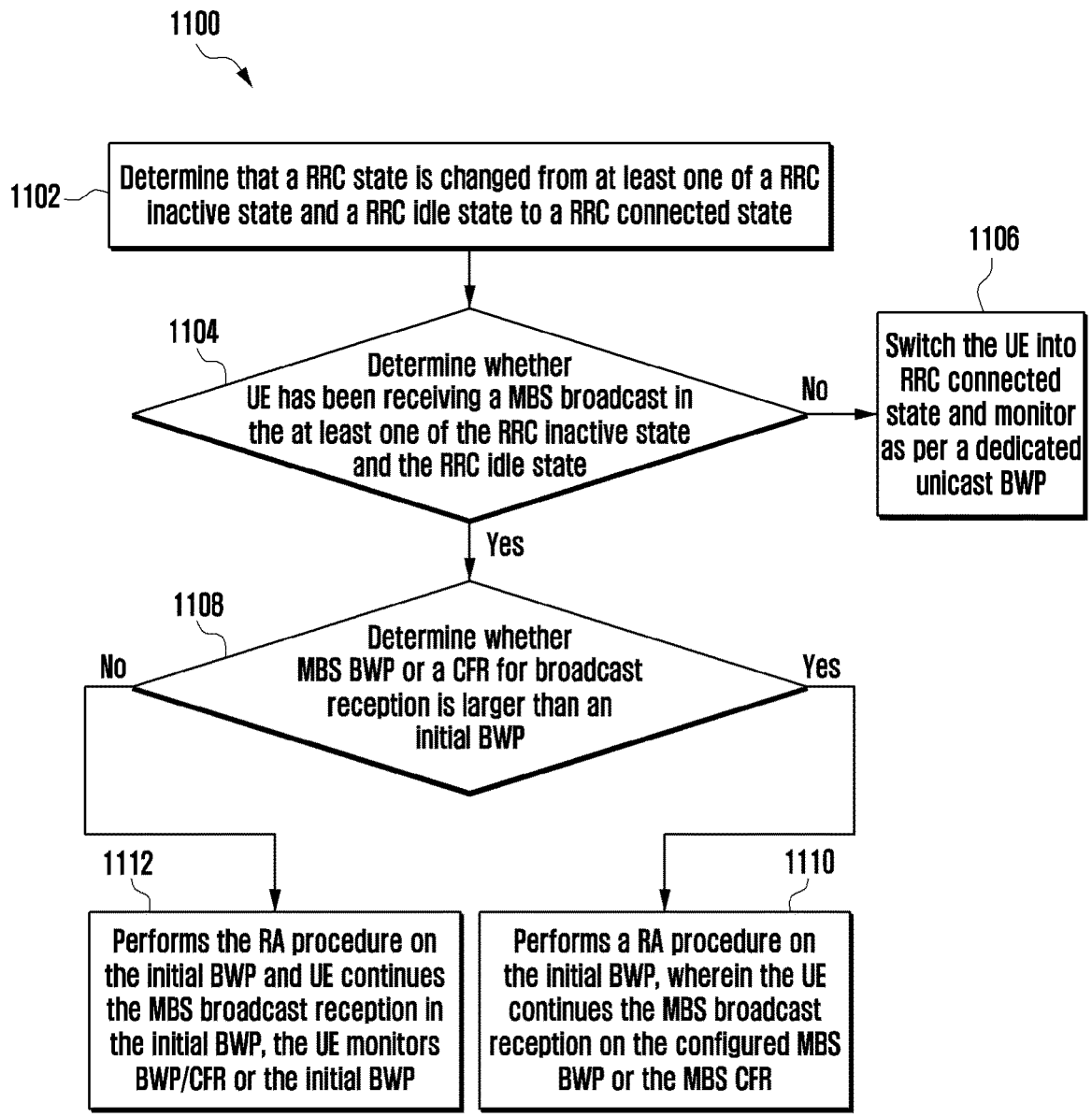
[Fig. 12]
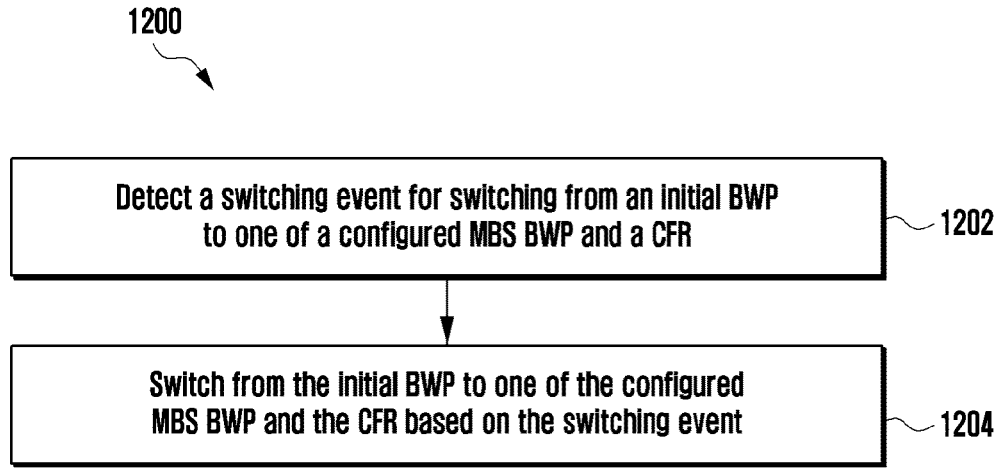

[Fig. 13]

Send a MCCH signalling message to a UE, wherein the MCCH signalling message comprises at least one of a list of DRX scheduling configurations and a list of MBS service configurations — 1302

Map the DRX scheduling configuration with a point-to-multipoint (PTM) service configuration based on an index of the DRX scheduling configuration provided in the PTM service configuration in the MCCH signalling message — 1304

[Fig. 14]

Receive at least one MBS service in a RRC connected state — 1402

Report a MBS interest indication message to a network entity, wherein the MBS interest indication message comprises at least one of a MBS service list, a frequency list and a priority MBS service — 1404

Stop to receive the all MBS services from the network entity — 1406

Send the MBS interest indication message with an empty message to indicate a complete loss of interest in the MBS and thereafter the UE stops reporting the MBS interest indication — 1408

[Fig. 15]
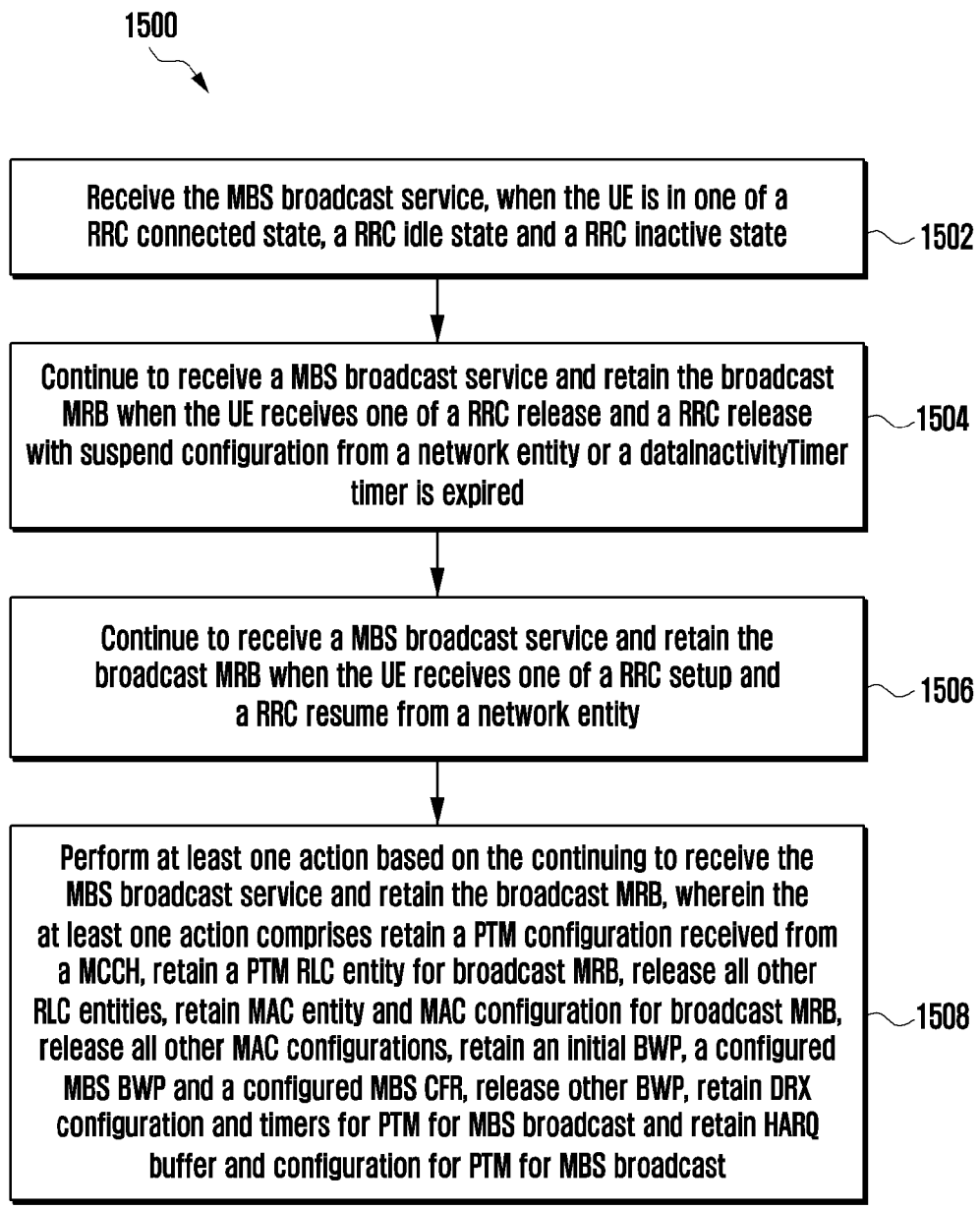

[Fig. 16]
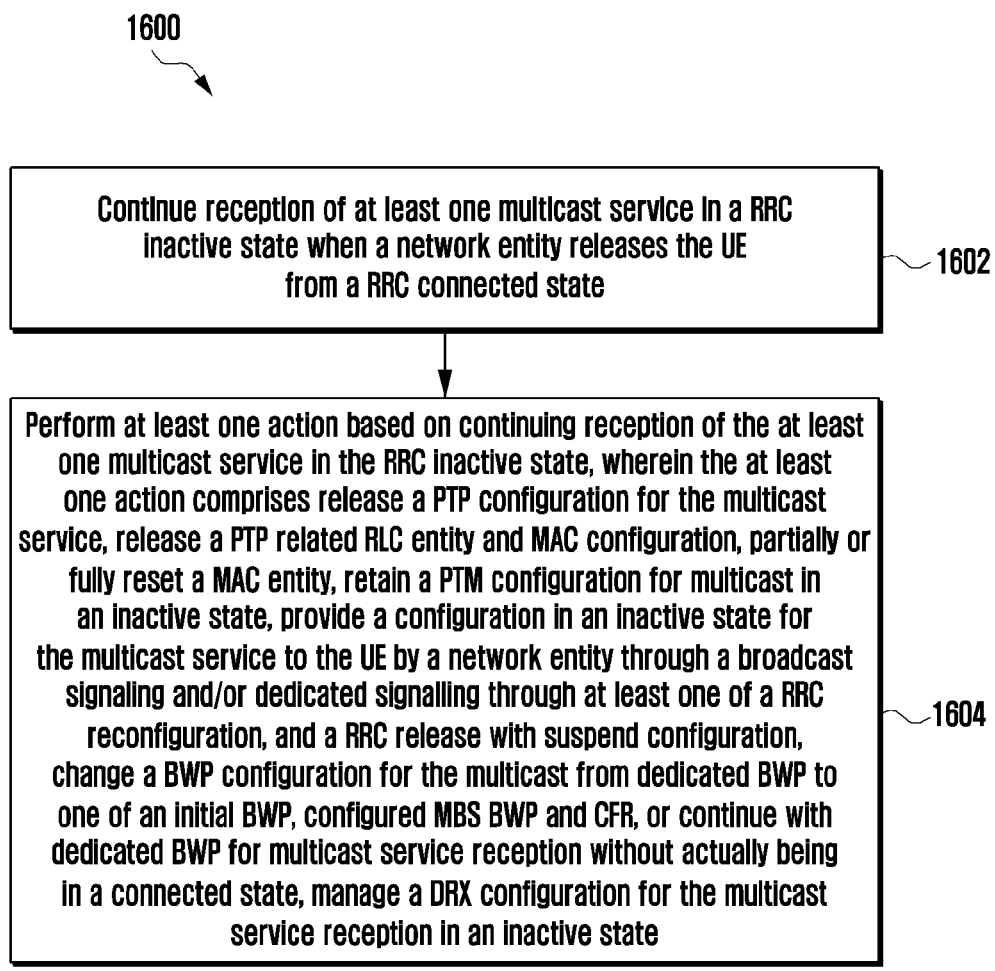

[Fig. 17]
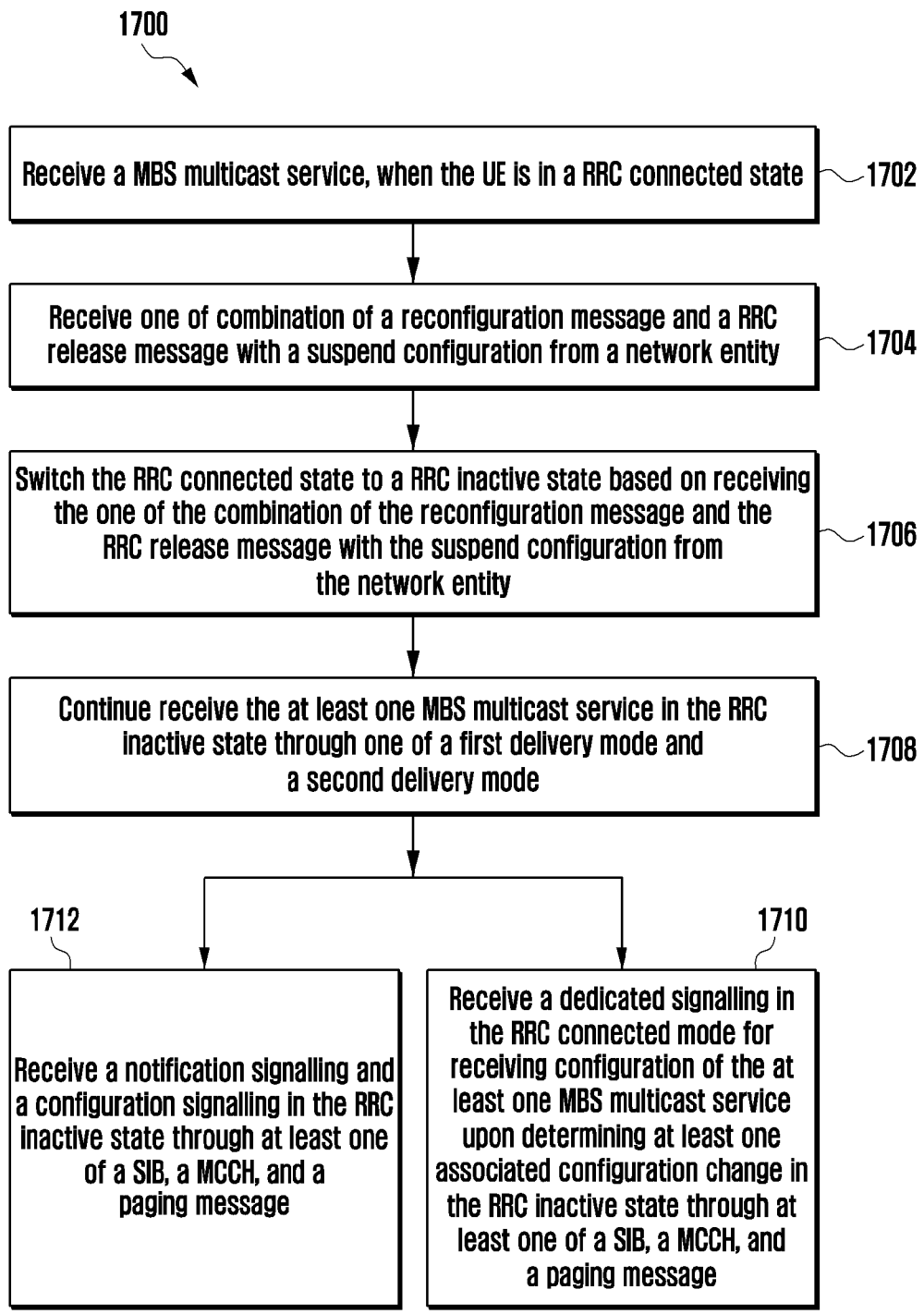

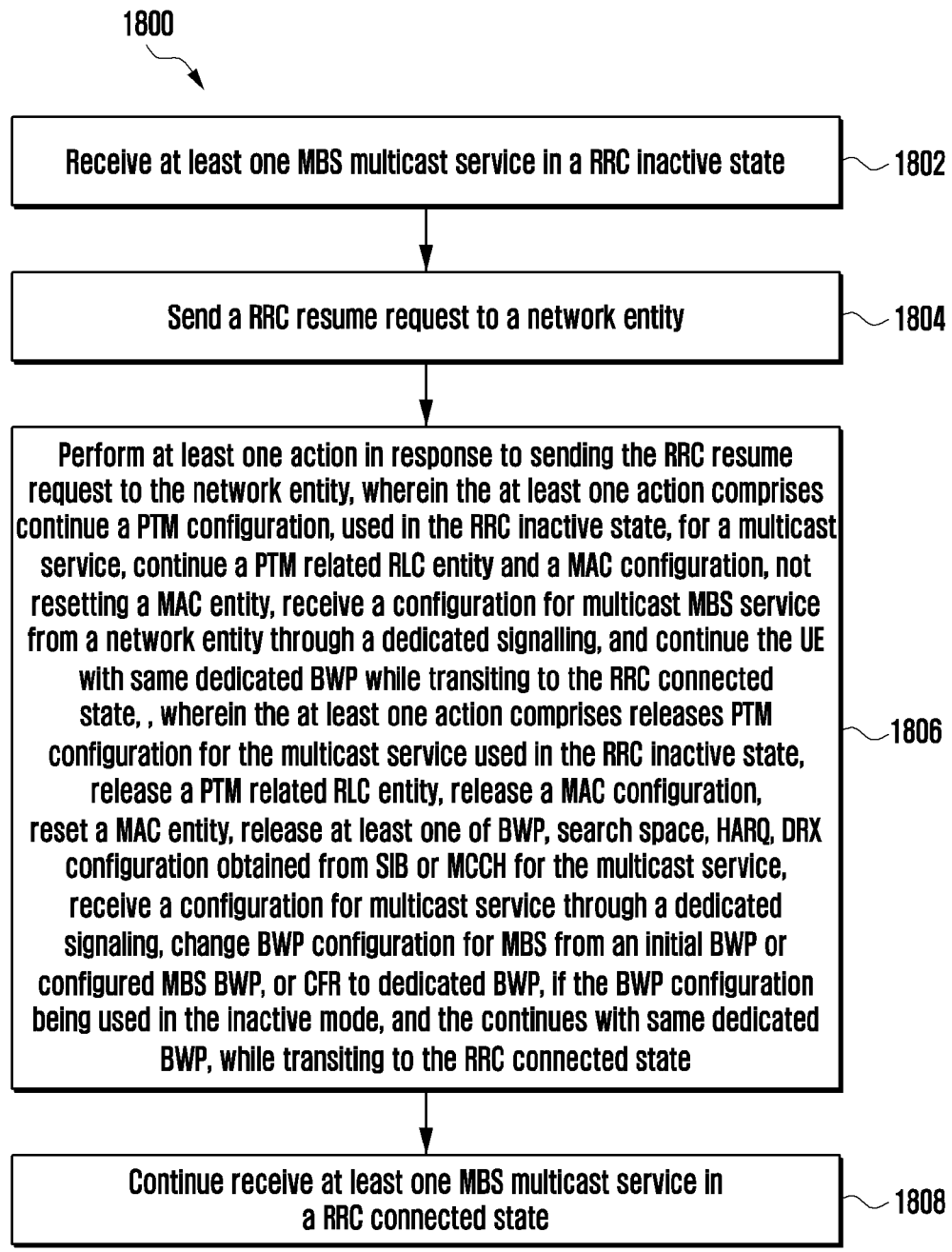

METHODS AND USER EQUIPMENT (UE) FOR HANDLING MBS SERVICE IN WIRELESS NETWORK

PRIORITY

This application is a National Phase Entry of PCT International Application No. PCT/KR2022/004524, which was filed on Mar. 30, 2022, and claims priority to Indian Provisional Patent Application No. 202141014450, which was filed on Mar. 30, 2021, and Indian Complete Patent Application No. 202141014450, which was filed on Mar. 22, 2022, the entire content of each of which is incorporated herein by reference.

TECHNICAL FIELD

Embodiments disclosed herein relate to wireless communication networks and more particularly to multicast/broadcast control signalling and idle/inactive mode procedures of Multicast Broadcast Services (MBS) for a New Radio (NR) in a 5th generation Radio Access Technology (RAT).

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

An aspect of the disclosure is to provide efficient and effective methods and a UE for MCCH configuration and operation and handling idle/inactive mode operation in an wireless communication system.

Solution to Problem

In order to solve problems such as described above, certain embodiments according to this disclosure propose a method performed by a terminal for handling a Multicast Broadcast Service (MBS) service in a wireless network (400), the method comprising receiving, by a User Equipment (UE) (100), a MBS Control control Channel channel (MCCH) configuration and at least one parameter associated with the MCCH configuration in a System system Information information block (SIB), configuring, by the UE (100), a MCCH channel based on the MCCH configuration and the parameter associated with the MCCH configuration, receiving, by the UE (100), a MCCH information message through the MCCH channel, configuring, by the UE (100), at least one MBS traffic channel (MTCH) based on the MCCH information message, and receiving, by the UE (100), the MBS service through the MTCH.

Meanwhile, according to various embodiments of the disclosure, A terminal for handling a Multicast Broadcast Service (MBS) service, the terminal comprising a transceiver, and at least one processor is configured to receive, via the transceiver, a MBS control channel (MCCH) configuration and at least one parameter associated with the MCCH configuration in a system information block (SIB), configure a MCCH channel based on the MCCH configuration and the parameter associated with the MCCH configuration, receive a MCCH information message through the MCCH channel, configure at least one MBS traffic channel (MTCH) based on the MCCH information message, and receive the MBS service through the MTCH.

Advantageous Effects of Invention

An embodiment of the disclosure may disclose efficient and effective methods and a UE for MCCH configuration and operation and handling idle/inactive mode operation for NR Multicast Broadcast Services (MBS) for New Radio (NR) in a 5th generation Radio Access Technology (RAT).

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 1A depicts the MBS delivery from a 5G CN to a 5G RAN and UE;

FIG. 1B depicts an example protocol stack for MBS in NR;

FIG. 1C depicts an example for control information signalling for MBS in NR;

FIG. 1D depicts an example for control information signalling for MBS in NR;

FIG. 2 illustrates an overview of a wireless network for handling various services, according to embodiments as disclosed herein;

FIG. 3 shows various hardware components of a UE, according to embodiments as disclosed herein;

FIG. 4 shows various hardware components of a network entity, according to embodiments as disclosed herein;

FIG. 5 is a flow chart illustrating a method for handling a MBS service in the wireless network, according to embodiments as disclosed herein;

FIG. 6 is a flow chart illustrating a method for handling a MBS service in the wireless network, according to embodiments as disclosed herein;

FIG. 7 is a flow chart illustrating a method for handling an on-demand MBS SIB reception in the wireless network, according to embodiments as disclosed herein;

FIG. 8 is a flow chart illustrating a method for handling an on-demand MBS SIB reception in the wireless network, according to embodiments as disclosed herein;

FIG. 9a is a flow chart illustrating a method for handling a MBS BWP switching in the wireless network, according to embodiments as disclosed herein;

FIG. 9b is a flow chart illustrating a method for method for handling a switching from one of a MBS BWP and a CFR to an Initial BWP in the wireless network, according to embodiments as disclosed herein;

FIG. 10 is a flow chart illustrating a method for method for handling a switching from one of a MBS BWP and a CFR to an Initial BWP in the wireless network, according to embodiments as disclosed herein;

FIG. 11 is a flow chart illustrating a method for handling a switching from an Initial BWP to one of a MBS BWP and the CFR in the wireless network, according to embodiments as disclosed herein;

FIG. 12 is a flow chart illustrating a method for handling a switching from an Initial BWP to one of a MBS BWP and the CFR in the wireless network, according to embodiments as disclosed herein;

FIG. 13 is a flow chart illustrating a method for handling a DRX configuration in the wireless network, according to embodiments as disclosed herein;

FIG. 14 is a flow chart illustrating a method for handling a signaling of MBS interest indication in the wireless network, according to embodiments as disclosed herein;

FIG. 15 is a flow chart illustrating a method for handling broadcast MRB retention in the wireless network, according to embodiments as disclosed herein; and FIG. 16 is a flow chart illustrating a method for handling multicast reception in a wireless network, according to embodiments as disclosed herein.

FIG. 17 is a flow chart illustrating a method for handling multicast reception in a wireless network, according to embodiments as disclosed herein.

FIG. 18 is a flow chart illustrating a method for handling multicast reception in a wireless network, according to embodiments as disclosed herein.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards, the latest existing communication standards, for the convenience of description. However, the disclosure is not limited by these terms and names, and may be applied in the same way to systems that conform other standards. In particular, the disclosure may be applied to the 3GPP new radio (NR: 5G mobile communication standards) system.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

In general, New Radio Multicast Broadcast Services (NR MBS) services include:
1. Multicast services, for which a wireless network transfers common user data that is intended to be received only by a specific group of User Equipment (UEs), which have joined the concerned multicast group.
2. Broadcast services, for which the wireless network transfers common user data that can be received by all UEs interested to receive the service.

The wireless network may provide MBS services in a limited part of the wireless network and coverage area of MBS services can be one cell or larger.

5G Core Network (CN) (300) can deliver MBS user data to the Radio Access Network (RAN) (200) (as depicted in FIG. 1A) using following delivery methods:
1. Individual delivery: for each individual UE (e.g., terminal) (100) receiving the MBS service, 5G CN (300) CN delivers separate copies of the MBS user data packets to the RAN (200a) (i.e., via per-UE PDU sessions, alike in case of unicast delivery).
2. Shared delivery: The 5G CN (300) delivers a single copy of MBS user data to the RAN (200a) i.e., via a shared PDU session/tunnel, with the RAN (200a) handling delivery to one or multiple UEs (100).

In case of shared delivery by the 5G CN (300), the RAN (200a) delivers MBS data to the UEs (100) using either Point-to-Point delivery (PTP) or Point-to-Multipoint (PTM) delivery. Furthermore, at the UE (100), reception via an MBS radio bearer (MRB) can be supported using:
1. a single/common SDAP entity.
2. a single/common PDCP entity.
3. a single PTM RLC bearer, a single PTP RLC bearer or a combination i.e., UE (100) simultaneously configured with a PTM and a PTP RLC bearer (also referred to as PTM and PTP legs).

More specifically, the UE (100) can be configured with:
1. A PTM RLC bearer only.
2. A PTP RLC bearer only, either using RLC Unacknowledged Mode (UM) or RLC Acknowledged Mode (AM).
3. A split RLC bearer i.e., both a PTM and PTP RLC bearer, both using RLC UM.
4. A split RLC bearer i.e., both a PTM and PTP RLC bearer, using RLC UM and RLC AM respectively.

FIG. 1B depicts an example protocol stack (10b) for the MBS in the NR. In an embodiment, MCCH (MBS Control Channel) and MTCH (MBS Traffic Channel) terms are defined for delivery mode 2 and/or broadcast services in Idle/Inactive/connected modes. Whereas MTCH (MBS Traffic channel) is used for delivery mode 1 and/or multicast services in connected mode and there is no MCCH present.

For broadcast services, the MCCH and MTCH are supported for control signalling and traffic respectively. MCCH configuration is provided by BCCH (i.e., a system information block). In turn, MCCH carries configuration information for the MTCH channels and services related information. Broadcast MBS services can be supported in Idle or Inactive or Connected mode in identical manner. This also implies only PTM mode is feasible for broadcast services. FIG. 1C and FIG. 1D depict an example for control information signalling for MBS in NR.

Referring to the FIG. 1C, the UE (100) is in the idle mode. At 102a, the RAN (200a) sends the BCCH/MCCH to the UE (100). At 104a, the UE (100) sends the assistance information/feedback to the RAN (200a). At 106a, the connection setup is established between the UE (100) and the RAN (200a). Referring to the FIG. 1D, the UE (100) is in the connected mode. At 102b, the RAN (200a) sends the BCCH/MCCH to the UE (100). At 104b, the RAN (200a) sends the DCCH to the UE (100).

The 3GPP is presently studying and specifying Rel-17 NR MBS work item. However, it is yet not clear as to:
1. How MCCH is configured?
2. What are configuration parameters for MCCH?
3. How a single and/or multiple MCCHs can work and how are they scheduled?
4. What are the contents to be carried by MCCH?
5. How Idle and/or Inactive mode operation for MBS service reception is performed?
6. How MBS operation is performed when the UE moves to/from Idle/Inactive states?

Accordingly, the embodiments herein provide methods for handling a MBS service in a wireless network. The method includes receiving, by a UE, a MCCH configuration and at least one parameter associated with the MCCH configuration in a SIB. Further, the method includes configuring, by the UE, a MCCH channel based on the MCCH configuration and the parameter associated with the MCCH configuration. Further, the method includes receiving, by the UE, a MCCH information message through the MCCH channel. Further, the method includes configuring, by the UE, at least one MTCH based on the MCCH information message. Further, the method includes receiving, by the UE, the MBS service through the MTCH.

The proposed method can be used for the MCCH configuration and operation and handling idle/inactive and connected mode operation for the NR MBS for in a 5th generation Radio Access Technology (RAT) in an efficient and effective manner.

Referring now to the drawings, and more particularly to FIGS. 2 through 18, where similar reference characters denote corresponding features consistently throughout the figures, there are shown example embodiments.

FIG. 2 illustrates an overview of a wireless network (400) for handling various services, according to embodiments as disclosed herein. The wireless network (400) can be, for example, but not limited to a 5G network, a 6G network, an ORAN network or the like. In an embodiment, wireless network (400) includes a UE (100) and a network entity (200). The UE (e.g., terminal) (100) can be, for example, but not limited to a laptop, a desktop computer, a notebook, a smartphone, a foldable phone, a smart TV, a tablet, an immersive device, a television, a connected car and an internet of things (IoT) device. The network entity (200) may also include or be referred to by those skilled in the art as a base station, a base transceiver station, a radio base station, an access point, a radio transceiver, an eNB, a gNodeB (GNB), a 5G gNB, or the like. The service can be, for example, but not limited to a MBS service, an on-demand MBS SIB reception, broadcast MRB retention, multicast reception or the like.

In an embodiment, single and/or multiple MCCH(s) are configured for NR MBS. The configuration and associated parameters are provided by System Information block (SIB). This SIB can be SIB1 and/or a different SIB and/or a new SIB defined for NR MBS purpose (for example, MBS SIB). The MBS SIB can be referred to as "sibx" or by some other name. When there are more than one MBS SIB, then the second MBS SIB can be referred to as "sibx1" and so on. The transmission windows (e.g., comprising of MCCH modification period and/or MCCH repetition periods) for one or more MCCHs can be configured as same or integral multiple or sub-multiple for one or more other MCCHs. Moreover, these MCCHs may have same or different radio frame offset (say MCCH-Offset).

In an embodiment, when there are more than one MCCH configured, each of the MCCH uses a different RNTI (say, x-MCCH-RNTI) and therefore, they correspond to a different MAC PDU (when they are scheduled in same slot).

Further, there may be a limitation on number RNTIs and/or physical channels and/or MAC PDUs and/or number of DCIs (Downlink Control Information), which may be supported together for a given slot. This will limit the number of MCCHs which can be supported simultaneously (when they are scheduled together in same slot).

In an embodiment, when there are more than one MCCH configured, each of the MCCH uses a same RNTI (say, MCCH-RNTI) and therefore, they may correspond to the same MAC PDU (when they are scheduled in same slot). Further, the MCCHs are distinguished by a different Logical Channel identity (LC ID) and MCCH(s) which are not of interest to the UE (100) are discarded at the MAC layer. Whereas MCCH(s) which are of interest are processed by the UE (100) at the MAC layer and passed to the RRC layer.

In an embodiment, the same RNTI is used for change notification and MCCH. The same RNTI is referred to as MCCH-RNTI. As change notification and MCCH (at least start of MCCH) can occur in the same slot, DCI information for MCCH can also carry change notification information.

In an embodiment, different RNTI is used for change notification and MCCH. When change notification and MCCH (at least start of MCCH) occur in the same slot, there are separate DCI for MCCH change notification and MCCH.

In an embodiment, information on multi-slot allocation for MCCH is provided in the first slot through the DCI (Downlink Control Information) i.e., when MCCH is segmented and/or occupying more than one slot, DCI in the first slot can provide the allocation information for multiple slots together.

In an embodiment, DCI (Downlink Control Information) and MCCH occupies more than one slot and it depends on the beamforming utilized (e.g., number of beams, number of MCCH segments).

In an embodiment, more than one MCCHs can be time multiplexed i.e., they are scheduled across different slots (or having different MCCH-Offset), so that the UEs can decode and receive MCCH at different times and/or use same RNTI for these MCCHs.

In an embodiment, more than one MCCHs can be multiplexed in the frequency domain. Further, they may occupy same or different transmission bandwidth (e.g., MBS BWP or CFR or CORESET). Further, MBS BWP/CFR can be confined within Initial BWP or is containing Initial BWP or extended over Initial BWP. This makes it feasible to receive SIB and paging simultaneously with MCCH reception. Further, the UE (100) can keep its frequency monitoring window to either MBS BWP or Initial BWP whichever is larger and containing other.

In an embodiment, the same beamforming approach is used for MCCH(s) and/or MTCH(s) irrespective of the UEs receiving being in Idle or Inactive or Connected state. MCCH(s) and/or MTCH(s) in the MBS BWP or CFR may be Quasi-Collocated with SSBs in the initial BWP. That implies same beamforming and beam selection is effective for MCCH and/or MTCH(s) as for the SSB. When the UE (100) has identified the best beam for a relevant SSB index, the UE (100) utilizes the same for the MCCH and/or MTCH(s) reception purpose.

In an embodiment, MCCH reception operation is identical for UEs irrespective of the UEs receiving being in Idle or Inactive or Connected state. In another embodiment, MCCH contents may be provided to the connected mode UEs by dedicated signalling.

In an embodiment, signalling of MCCH configuration through SIB or MBS SIB signalling is provided.

In an embodiment, for NR MBS, SIB or MBS SIB carries a list of "N" set of parameters, where N is the number of MCCHs provided by the wireless network (400) over the cell or area (where 1≤N). Each set of parameters include at least one of the following MCCH-Offset: indicates the radio frame offset for MCCH scheduling.

MCCH-First-Sub-frame: indicates the first sub-frame where MCCH is scheduled.

MCCH-First-Slot: indicates the first slot in the sub-frame where MCCH is scheduled. The range of this parameter may be based on sub-carrier spacing (SCS) and/or BWP used for MCCH transmission.

MCCH-Duration: indicates the duration (number of slots) where MCCH is scheduled. This parameter may be indicated for consecutive downlink slots where MCCH is transmitted by the wireless network (400).

MCCH-Repetition-Period: indicates the interval for MCCH within the modification period, where MCCH is repeated.

MCCH-Modification-Period: indicates the period or interval for MCCH by which updated contents for MCCH is transmitted.

1. MCCH-DRX-Scheduling-Info: DRX configuration for MCCH. If it is not present, there is no DRX used for MCCH.
2. MCCH-RNTI: indicates the RNTI used for the given MCCH.
3. MCCH-MCS: indicates the MCS (modulation and coding scheme) used for the given MCCH.
4. MCCH-Area-Identity: indicates the identity for the service area or transmission area for the given MCCH. When the UE (100) moves across cell/area, one or more MCCH-Area-Identity may be indicated same as previous cell and the UE (100) can assume continuity of pertinent MCCH(s).

Further, in an embodiment, MCCH-First-Sub-frame and MCCH-First-Slot can be combined as a single parameter e.g., expressed as a parameter given by (MCCH-First-Sub-frame*{Number of slots/per sub-frame}+MCCH-First-Slot) or a parameter for slot offset in the radio frame. Further, this could be number of downlink slots or (downlink+flexible) slots i.e., excluding uplink slots in between, if any.

In another embodiment, only one set of parameters is provided in spite of "N" number of MCCHs, (where 1≤N). In this case, all MCCHs share the same set of configuration parameters. Alternatively, MCCHs are organized in time-multiplexed manner and one MCCH is followed by the second MCCH and so on.

In another embodiment, some of the MCCHs can be grouped together and provided the same set of parameters, as described earlier; whereas, other MCCHs or MCCH groups can be provided a different set of parameters. For this purpose, a bitmap or a field is provided along with the given set of parameters indicating which all MCCHs are addressed by the set of parameters.

In another embodiment, a subset of parameters may be shared for more than one MCCHs; whereas another subset of parameters may be different for more than one MCCHs.

In an embodiment, MBS SIB provides the maximum duration for the MCCH. That is, the UE (100) can decode for MCCH scheduling up to this maximum duration (i.e., number of slots). Alternatively, the maximum duration for the MCCH is provided in the 3GPP specification.

In an embodiment, MCCH duration is not provided by SIB and the MCCH duration is blindly decoded; i.e., the UE (100) continues to decode for MCCH RNTI through continuous downlink slots and when there is no MCCH RNTI decoded, the UE (100) discontinues blind decoding of the MCCH.

In an embodiment, an example signaling message structure is provided for the MCCH configuration (i.e., timings related configuration) in the MBS SIB (also termed as SIBx) is shown in table 1 below:

TABLE 1

```
SIBx-r17 ::= SEQUENCE {
mcch-Config-r17 MCCH-Config-r17,
cfr-ConfigMCCH-MTCH-r17 CFR-ConfigMCCH-MTCH-r17,
lateNonCriticalExtension OCTET STRING OPTIONAL,
...
}
MCCH-Conlig-r17 ::= SEQUENCE {
mcch-RepetitionPeriodAndOffset-r17 MCCH-RepetitionPeriodAndOffset-r17,
mcch-WindowStartSlot-r17 INTEGER (0..79),
mcch-WindowDuration-r17 ENUMERATED {sl2, sl4, sl8, sl10, sl20, sl40, sl80,
sl160} OPTIONAL, -- NEED S
mcch-ModificationPeriod-r17 ENUMERATED {rf2, rf4, rf8, rf16, rf32, rf64, rf128,
rf256,
rf512, rf1024, r2048, rf4096, rf8192, rf16384, rf32768, rf65536}
}
MCCH-RepetitionPeriodAndOffset-r17 ::= CHOICE {
rf1-r17 INTEGER(0),
rf2-r17 INTEGER(0..1),
rf4-r17 INTEGER(0..3),
rf8-r17 INTEGER(0..7),
rf16-r17 INTEGER(0..15).
rf32-r17 INTEGER(0..31),
rf64-r17 INTEGER(0..63).
rf128-r17 INTEGER(0..127).
rf256-r17 INTEGER(0..255)
}
```

When there is change of MCCH contents, the UE (100) is informed by the change notification (PDCCH or DCI) in the first sub-frame and/or first slot in every repetition period for a pertinent MCCH. The UE (100) can then acquire the updated pertinent MCCH in the same first sub-frame and/or first slot and/or specified sub-frame and/or slot, where the pertinent MCCH is scheduled as per configuration by the SIB or MBS SIB.

When there are more than one MCCHs supported in the cell or area, the bitmap or field can be used where a bit corresponds to a specific MCCH. The ordering of the bits in the bitmap pertains to the MCCH configuration ordering in the SIB or MBS SIB.

In an embodiment, MCCH-Duration field is provided in the change notification (PDCCH or DCI) and accordingly, the UE (100) can decode the MCCH starting from the first sub-frame and/or first slot, where change notification is received and until the MCCH-Duration number of slots. This may also be number of downlink slots.

For UEs actively receiving MBS services, receiving MCCH duration information in the SIB or MBS SIB inherently poses limitation on MCCH scheduling, when the change in MCCH duration needs to be communicated through Paging or SIB signaling and corresponding MCCH repetition/modification duration in that cell is small. Also, such configuration involves SIB acquisition and processing delay, which can lead to possible loss of MCCH and thereby loss of MBS data. This is especially true for low latency and critical services. Therefore, it is determined that RRC level signaling is not quite appropriate for conveying MCCH duration information for UEs actively receiving MBS services. Desirable approach should be based on lower layer signaling with low latency, power efficient method which is localized in implementation e.g., indication on PDCCH (similar to MCCH change notification) can be utilized.

In an embodiment, the UE (100) can use the available bits in PDCCH of MCCH change notification for efficiently conveying MCCH duration, when MCCH is scheduled over multiple slots. For example, three unused bits in PDCCH are utilized to indicate the duration across which segmented MCCH is scheduled and thereby, used by UEs actively receiving MBS services.

MCCH-Duration may also be provided for more than one MCCH when MCCH configurations (e.g., MCCH-Offset etc.) are different for these MCCHs.

In an embodiment, PDCCH or DCI rather provides maximum duration for the MCCH. That is, the UE (100) can decode for MCCH scheduling up to this maximum duration (i.e., number of slots).

In an embodiment, MCCH duration is not provided by the change notification (PDCCH/DCI) and MCCH duration is blindly decoded; i.e., the UE (100) continues to decode for MCCH RNTI through continuous downlink slots and when there is no MCCH RNTI decoded, the UE (100) discontinues blind decode of the MCCH.

In an embodiment, MCCH decoding and reception is based on the DRX scheduling for the MCCH. The UE (100) continues to decode MCCH in accordance with DRX active time (On-duration and/or Inactivity timer).

In an embodiment, the UE (100) applies MBS SIB acquisition procedure upon, at least one of the following
Cell selection (e.g., upon power on).
Cell-reselection.
Return from out of coverage.
After reconfiguration with sync completion.
After entering the network entity from another RAT.
Upon receiving an indication that the system information or MBS SIB has changed.
Whenever the UE (100) does not have a valid version of a stored SIB or MBS SIB or a valid version of a requested MBS SIB.
On activation of MBS request by user or service layer.
On MBS service/session start request by user or service layer
When MCCH change indication is notified and UE (100) needs to know duration for MCCH.

In an embodiment, the UE (100) checks if it has a stored version of MBS SIB (e.g., SIBx and/or SIBx1) and it is valid (e.g., cell or area scope for SIB is valid). In case, it meets the conditions, the UE (100) does not acquire or receive MBS SIB. Otherwise, the UE acquires and receives MBS SIB. Further, the UE (100) may check for the validity of MCCH (e.g., cell or area scope for MCCH is valid) and accordingly may or may not acquire MCCH.

In an embodiment, on demand system information for MBS is supported. For this purpose, If SIB1 includes si-SchedulingInfo containing si-RequestConfig The UE (100) triggers the lower layer to initiate the random access procedure on normal uplink and/or supplementary uplink using the PRACH preamble(s) and PRACH resource(s) in si-RequestConfig corresponding to the SI message(s) that the UE (100) requires to receive MBS SIB within the cell, and for which siBroadcastStatus is set to "not Broadcasting". The UE (100) acquires the requested SI message(s) for MBS SIB when acknowledgement for SI request has been received from the lower layers.

If SIB1 does include si-SchedulingInfo containing si-RequestConfig

The UE (100) initiates transmission of the RRCSystemInfoRequest message;

If acknowledgement for RRCSystemInfoRequest message is received from lower layers, the UE (100) acquires the requested SI message(s) immediately.

In an embodiment, if the UE (100) is in Connected mode and has a stored valid version of a MBS SIB (e.g. SIBx and/or SIBx1), that the UE (100) requires to operate within the cell, the UE uses the stored version of the required MBS SIB.

In an embodiment, if the UE (100) is in Connected mode and its active BWP does not include or is not configured with common search space for MBS SIB and the UE (100) does not have a valid stored version of MBS SIB (e.g., SIBx and/or SIBx1), UE (100) requests for the on demand MBS SIB. For this purpose, 1> for the SI message(s) that, according to the mbsSI-SchedulingInfo in the stored SIB1, contain at least one required MBS SIB:
2> if onDemandSIB-Request is configured and timer Txxx is not running:
3> initiate transmission of the DedicatedSIBRequest message;
3> start timer Txxx with the timer value set to the onDemandSIB-RequestProhibitTimer;

In an embodiment, if the UE (100) is in the connected mode and its active BWP includes or is configured with common search space for MBS SIB and the UE (100) does not have a valid stored version of MBS SIB (e.g., SIBx and/or SIBx1), the UE (100) requests for on demand MBS SIB. For this purpose, 1> for the SI message(s) that, according to the si-SchedulingInfo in the stored SIB1, contain at least one required MBS SIB and for which si-BroadcastStatus is set to "broadcasting":
2> acquire the SI message(s);
2> for the SI message(s) that, according to the si-SchedulingInfo in the stored SIB1, contain at least one required MBS SIB and for which si-BroadcastStatus is set to "not Broadcasting":
3> if onDemandSIB-Request is configured and timer Txxx is not running:
4> initiate transmission of the DedicatedSIBRequest message;
4> start timer Txxx with the timer value set to the onDemandSIB-RequestProhibitTimer;
4> acquire the requested SI message(s) corresponding to the requested MBS SIB(s).

In an embodiment, the UE (100) may include on demand request for SIB and/or posSIB(s) and/or MBS SIB(s) (referred to as sibx and sibx1) in the same DedicatedSIBRequest message. For this purpose, the UE (100) sets required MBS SIB(s) in requestedSIB-List within onDemandSIB-RequestList of DedicatedSIBRequest message.

As an example,
    DedicatedSIBRequest-IEs ::= SEQUENCE {
    onDemandSIB-RequestList SEQUENCE {
    requestedSIB-List SEQUENCE (SIZE (1..maxOnDemandSIB))OF SIB-ReqInfo OPTIONAL,
    requestedPosSIB-List SEQUENCE (SIZE (1..maxOnDemandPosSIB)) OF PosSIB-ReqInfo OPTIONAL
    } OPTIONAL,
    lateNonCriticalExtension OCTET STRING OPTIONAL,
    nonCriticalExtension SEQUENCE { } OPTIONAL
    }
    SIB-ReqInfo ::= ENUMERATED { sib12, sib13, sib14, sibx, sibx1, spare3, spare2, spare1 }

In an embodiment, if the UE (100) is in the connected mode and its active BWP does not include or is not configured with common search space for MCCH and/or the UE does not have a valid stored version of MCCH, the UE (100) requests for on demand MCCH. For this purpose, 1> for the SI message(s) that, according to the mbsSI-SchedulingInfo in the acquired/stored SIB1, contain at least one required MBS SIB and/or acquired/stored MBS SIB has MCCH configuration:
2> if onDemandMCCH-Request is configured and timer Txxx is not running:
3> initiate transmission of the DedicatedMCCHRequest message;
3> start timer Txxx with the timer value set to the onDemandMCCH-RequestProhibitTimer;

Further, the UE (100) sets DedicatedMCCHRequest message for one or more MCCHs as given in below example DedicatedMCCHRequest-IEs ::= SEQUENCE {
    onDemandMCCH-RequestList SEQUENCE {
    requestedMCCH-List SEQUENCE (SIZE (1..maxOnDemandMCCH)) OF MCCH-ReqInfo OPTIONAL,
    } OPTIONAL,
    lateNonCriticalExtension OCTET STRING OPTIONAL,
    nonCriticalExtension SEQUENCE { } OPTIONAL
    }
    MCCH-ReqInfo ::= ENUMERATED { mcch1, mcch2, mcch3,spare5, spare4, spare3, spare2, spare1 }

In an embodiment, for MBS SIB (or related SI message) and/or MCCH acquisition PDCCH monitoring occasion(s) are determined according to searchSpaceOtherSystemInformation as define in legacy NR specification or newly defined searchSpaceMBSSystemInformation for the NR MBS.

In an embodiment, MCCH transmission (e.g., repetition and/or modification) from the network side is scheduled such that it is an offset from the SIB or MBS SIB (e.g., repetition and/or modification) scheduling. This provides for no potential conflict of BCCH and MCCH occurrence. Further, the offset can be controlled in a way so that there is minimum latency in acquiring MCCH once SIB or MBS SIB is acquired by the UE (100).

In an embodiment, if the UE (100) is in the connected mode and its active BWP does not include or is not configured with common search space for MBS SIB and the UE (100) is having a broadcast MBS service or interested to receive MBS service and/or MCCH change indication is received:

1. If on demand MBS SIB is supported and/or configured, the UE (100) acquires on demand MBS SIB message.

If on demand MBS SIB has not been configured or is not supported, the UE (100) initiates an MBS interest indication to the wireless network (400) and/or the UE (100) abandons broadcast MBS service and/or UE avails concerned MBS service from network through PTP or unicast mode.

In an embodiment, if the UE (100) is in the connected mode and its active BWP includes or is configured with common search space for MCCH and the UE (100) is having a broadcast MBS service and/or MCCH change indication is received, the UE (100) acquires the MCCH message.

In an embodiment, if the UE (100) is in connected mode and its active BWP does not include or is not configured with common search space for MCCH and the UE (100) is having a broadcast MBS service and/or MCCH change indication is received:

1. If on demand MCCH is configured, the UE (100) acquires the on demand MCCH message.
2. If on demand MCCH has not been configured, the UE (100) initiates an MBS interest indication to the network and/or the UE (100) abandons broadcast MBS service and/or UE (100) avails concerned MBS service from network through PTP or unicast mode.

In an embodiment, the UE (100) may inform interest indication to the network and therefore, make sure, best possible effort based delivery for broadcast service. However, the network may not be bound by this signalling. Further, it is significant to see that the MBS interest indication requirement for multicast services (delivery mode 1) is much more essential and motivated to in order to achieve setup, sustain and pursue multicast services with network involvement. Therefore, it seems important to merge the MBS interest indication for broadcast services and multicast services in connected mode from triggers and reporting perspective (i.e., a common interest indication message). Further, the same interest indication message can have separate parts/sets for broadcast services and multicast services and associated parameters like preferred BWP, priority, service list, frequencies, preferred mode (e.g., RLC AM or UM, PTP or PTM etc.). In other embodiment a common set is used for broadcast and multicast services and network can distinguish broadcast and multicast services based on their identity (e.g., TMGI).

In another embodiment, triggers and reporting of interest indication for broadcast services and multicast services are performed separately.

In another embodiment, the MBS interest indication is sent to the network entity, when the UE (100) has 0 interested MBS services. The 0 interested MBS services can be considered for broadcast services only and/or multicast services only and/or both broadcast and multicast services together. Further, an identifier or a field is used in interest indication message to indicate whether interest indication includes broadcast services and/or multicast services.

In an embodiment, an example signaling structure is provided for MBS interest indication message including a 0 MBS service when there is a complete loss of interest at the UE as follows table 2:

TABLE 2

```
MBSInterestIndication-r17-IEs ::= SEQUENCE {
mbs-FreqList-r17 CarrierFreqListMBS-r17 OPTIONAL,
mbs-Priority-r17 ENUMERATED {true} OPTIONAL,
mbs-ServiceList-r17 MBS-ServiceList-r17 OPTIONAL
}
MBS-ServiceList-r17 ::= SEQUENCE (SIZE
(0..maxNrofMBS-ServiceListPerUE-r17)) OF MBS-ServiceInfo-r17
```

TABLE 2-continued

```
MBS-ServiceInfo-r17 ::= SEQUENCE {
tmgi-r17 TMGI-r17
}
```

In an embodiment, the UE (100) receives NR MBS (Change notification and/or MCCH and/or MTCH) in accordance with the TDD-UL-DL-Config-common/TDD-UL-DL-Config-dedicated and/or SFI signalling and/or Dynamic DCI based on the UE state (Idle or Inactive or Connected) to determine the downlink slots or downlink symbols and/or flexible slots/symbols.

In an embodiment, the UE (100) acquires MCCH when at least one of the following conditions are met:

1. The UE (100) is powered on and Cell camped is broadcasting MBS SIB and/or SIB including MCCH configuration.
2. On cell selection and Cell selected is broadcasting MBS SIB and/or SIB including MCCH configuration.
3. On cell reselection and Cell reselected is broadcasting MBS SIB and/or SIB including MCCH configuration.
4. On handover and target cell is broadcasting MBS SIB and/or SIB including MCCH configuration.
5. On MCCH change indication (e.g., service start, change of MCCH, service stop etc.).
6. On at least one NR MBS service activation and/or deactivation.
7. On at least one NR MBS service suspension and/or resumption.
8. When the UE (100) is already receiving NR MBS services (e.g., broadcast services), the UE acquires MCCH every modification period (e.g., at beginning of each modification period). If the UE could receive MCCH, then the UE (100) may not receive MCCH at other repetition in the same modification period.
9. On MBS activation by user or service layer.
10. On change of MBS service by user or service layer which is mapped to a different MCCH.
11. When the UE's interested services change.
12. On receiving MBS SIB in response to DedicatedSIBRequest in Connected mode.
13. On receiving MBS SIB in response to random access as per si-RequestConfig in Idle/Inactive mode.
14. On receiving MBS SIB in response to RRCSystemInfoRequest in Idle/Inactive mode.
15. When change in active BWP in Connected mode and its new active BWP does not include and/or is not configured with common search space for MCCH and the UE (100) is having a broadcast MBS service and/or MCCH change indication is received
16. —When change in active BWP in Connected mode and its new active BWP includes and/or is configured with common search space for MCCH and the UE (100) is having a broadcast MBS service and/or MCCH change indication is received MCCH configuration: In an embodiment, configuration for MCCH can be provided by the SIB or MBS SIB (e.g., SIBx). When the MBS specific SIB is present/used, scheduling information for MBS SIB is provided in SIB e.g., SIB1.

In an embodiment, configuration parameters include at least one of the following 1. Configured MBS BWP (Bandwidth Part) or CFR (Common Frequency Resource). That includes frequency domain resources e.g., starting Physical Resource Block(PRB), number of PRBs, sub-carrier spacing (SCS) etc.

2. Search space (e.g., identity of search space like searchspace #0, other common searchspace).
3. Beamforming parameters (e.g., number of SSBs transmitted, number of PDCCH monitoring occasion for MCCH)
4. Quasi-collocation information (e.g., QCL'ed with SSB).
5. Bandwidth for MCCH (e.g., same as Initial BWP, same as CORESET #0, Same as configured MBS BWP or MBS CFR, same as bandwidth used for MTCH, explicitly configured per MCCH or for all MCCHs).
6. Sub-carrier spacing (SCS) (e.g., it can be explicitly configured or can be same as used for Initial BWP).
7. Cyclic Prefix (CP) (e.g., it can be explicitly configured or can be same as used for Initial BWP).
8. Modulation and coding Scheme (MCS) (e.g., it can be per MCCH or common for all MCCHs).
9. HARQ configuration (e.g., no HARQ mode or feedback-less HARQ retransmission mode or same as that used for MTCH).

Further, MCCH change notification (PDCCH/DCI) and/or MCCH can be received by the UE (100) in the Initial BWP and/or configured MBS BWP or CFR e.g., when the configured MBS BWP or CFR is smaller or confined within the initial BWP. Configuration parameters in SIB or MBS SIB also includes the HARQ for MCCH (e.g., no HARQ mode or feedback-less HARQ retransmission mode), CORESET and beamforming related configuration. Further, in turn, the MCCH may carry configuration parameters which includes the HARQ for MBS service or MTCH (e.g., no HARQ mode or feedback-less HARQ retransmission mode) and/or configured MBS BWP or CFR for MBS.

In an embodiment, an example signaling message structure is provided for the MCCH configuration (i.e., BWP/CFR related configuration) in the MBS SIB (also termed as SIBx) is as follows table 3:

MCCH contents: In one embodiment, MCCH signalling can be done more effectively with an overall list of DRX scheduling configurations in the beginning of the MCCH message or through broadcast System Information and an index to this list is indicated for each service configuration. Effectively, it provides a mapping of the DRX scheduling configuration and a PTM service. Embodiments herein can have more than one index for a service i.e., apart from one to one mapping, one to many or many to one mapping is also possible in the approach. Further, multiple services having common DRX scheduling configurations can be grouped together, which facilitates the operations for the UE (100) as well as reduce the signaling message size.

In an embodiment, DRX scheduling configuration information is provided as a list of DRX scheduling where each one has pertinent one or more PTM services. This is specifying a possibility where multiple multicast/broadcast services share a common DRX scheduling configuration. Also, the UE, which is capable of receiving more than one multicast/broadcast services together, can as well receive these services together and effectively, save on power consumption. Possibly, the network entity may schedule certain services disjoint with different DRX scheduling configurations so as to enable the UEs to receive these services even if the capability of the UE (100) is limited in terms of receiving more services simultaneously.

In an embodiment, an exhaustive, pre-defined list is provided in the specification and need not be transmitted. This will comprise of all possible combinations of the DRX scheduling parameters i.e., different values of DRX timers organized in a table and an index to the table entry refers to a specific combination of these DRX timers. It is also feasible to define sub-set(s) of this list considering different deployments may possibly use sub-set(s) of the list and not the complete exhaustive list.

TABLE 3

```
SIBx-r17 ::= SEQUENCE {
mcch-Config-r17 MCCH-Config-r17,
cfr-ConfigMCCH-MTCH-r17 CFR-ConfigMCCH-MTCH-r17,
lateNonCriticalExtension OCTET STRING OPTIONAL,
...
}
CFR-ConfigMCCH-MTCH-r17::= SEQUENCE {
locationAndBandwidthBroadcast-r17 LocationAndBandwidthBroadcast-r17,
pdsch-ConfigMCCH-r17 PDSCH-ConfigBroadcast-r17,
commonControlResourceSetExt-r17 ControlResourceSet OPTIONAL -- Cond
NotSIB1CommonControlResource
}
LocationAndBandwidthBroadcast-r17::= CHOICE {
sameAsCoreset0-r17 NULL,
sameAsSib1ConfiguredLocationAndBW-r17 NULL,
locationAndBandwidth-r17 INTEGER (0..37949)
}
```
commonControlResourceSetExt
An additional common control resource set which may be configured and used for searchSpaceMCCH/searchSpaceMTCH or UE-specific search space in the BWP where searchSpaceMCCH is configured. It is contained in the bandwidth of locationAndBandwidthBroadcast.
locationAndBandwidthBroadcast
Indicates starting PRB and the number of PRBs of CFR used for MCCH and MTCH reception.
Value sameAsCoreset0 means the CFR for broadcast has the same location and size as CORESET0.
Value sameAsSib1ConfiguredLocationAndBW means the CFR for broadcast has the same location and size as the locationAndBandwidth for initial BWP configured in SIB1.
Value locationAndBandwidth is used to configure CFR with bandwidth that is larger than the bandwidth for initial BWP configured in SIB1.

In an embodiment, an example signaling message structure is provided for the MCCH contents (i.e., DRX and PTM service configuration mapping) in the MCCH message as follows table 4:

TABLE 4

```
MBSBroadcastConfiguration-r17-IEs ::= SEQUENCE {
mbs-SessionInfoList-r17 MBS-SessionInfoList-r17,
mbs-NeighbourCellList-r17 MBS-NeighbourCellList-r17 OPTIONAL, -- Need S
drx-ConfigPTM-List-r17 SEQUENCE (SIZE (1..maxNrofDRX-ConfigPTM-r17)) OF
DRX-ConfigPTM-r17 OPTIONAL, -- NEED R
pdsch-ConfigMTCH-r17 PDSCH-ConfigBroadcast-r17 OPTIONAL, -- Need S
mtch-SSB-MappingWindowList-r17 MTCH-SSB-MappingWindowList-r17
OPTIONAL, -- Need R
lateNonCriticalExtension OCTET STRING OPTIONAL,
nonCriticalExtension SEQUENCE { } OPTIONAL
}
MBS-SessionInfoList-r17 ::= SEQUENCE (SIZE (0..maxNrofMBS-Session-r17)) OF
MBS-SessionInfo-r17
MBS-SessionInfo-r17 ::= SEQUENCE {
mbs-SessionId-r17 TMGI-r17,
g-RNTI-r17 RNTI-Value,
mrb-ListBroadcast-r17 MRB-ListBroadcast-r17 OPTIONAL,
mtch-SchedulingInfo-r17 DRX-ConfigPTM-Index-r17 OPTIONAL, -- NEED S
mtch-NeighbourCell-r17 BIT STRING (SIZE(maxNeighCell-MBS-r17))
OPTIONAL,-- NEED R
pdsch-ConfigIndex-r17 PDSCH-ConfigIndex-r17 OPTIONAL, -- NEED S
mtch-SSB-MappingWindowIndex-r17 MTCH-SSB-MappingWindowIndex-r17
OPTIONAL -- NEED R
}
DRX-ConfigPTM-Index-r17 ::= INTEGER (0..maxNrofDRX-ConfigPTM-1-r17)
```

To avoid frequent reading of MCCH, an additional bit in PDCCH notification representing "Change in SC-MCCH" is provided in an embodiment herein. This bit is different from the PDCCH notification of the legacy indicating of "Start of new service" as in LTE MBMS. Effectively, with the proposed approach, the UE (100) which is actively receiving one or more PTM service(s) is not required to read MCCH every modification period. A new bit indicating "change in MCCH" is used in PDCCH notification to prior inform the UE (100) on MCCH in next modification period. The bit when set represents the change in MCCH, otherwise no change in MCCH. More specifically, there is a 2-bit bitmap carried as MCCH change notification in the DCI format 4_0 which is scrambled by MCCH-RNTI. The MSB in the bitmap, when set to 1 indicates the start of MBS session. The LSB in the bitmap when set to 1 indicates the modification of MCCH information other than start of MBS session and it may represent modification of a configuration of an at least one on-going MBS session or stop of at least one MBS session or change of at least one neighboring cell information.

In an embodiment, power saving aspect is targeted due to frequently monitoring of MCCH change notification. Change in MCCH can be indicated through a DCI on the first sub-frame of the on-duration time for the active service. This way the UE (100) doesn't need to monitor the specific sub-frame for MCCH change notification and disrupt its power saving cycle.

In an embodiment, power saving aspect is targeted due to frequently monitoring of MCCH change notification. Change in MCCH can be indicated through MAC-CE on the first sub-frame of the on-duration time for the active service. This way a UE (100) does not need to monitor the specific sub-frame for MCCH change notification and disrupt its power saving cycle.

In an embodiment, power saving aspect is targeted due to frequently monitoring of MCCH change notification. Any change in the MCCH can be indicated through paging message or group paging message for the active service at the specified or configured timing.

In an embodiment, MCCH can be empty, i.e., it does not contain any MTCH configuration information in the message. That implies, a zero MTCH is a valid scenario. A potential use case could be for network which has suspended and/or deactivated all its MTCH services and/or is yet to start transmission for its MTCH services.

In an embodiment, MBS service suspension/deactivation and/or resumption/activation information is conveyed in the MCCH message. For this purpose, each of the MBS service which is going to be suspended and/or is suspended is indicated with a field signifying suspension. Alternatively, absence (presence) of the MBS service information from MCCH message may indicate suspension (resumption) of the concerned MBS service.

Idle/Inactive mode operation: In an embodiment, the UE (100) switches from the configured MBS BWP (Bandwidth Part) or CFR (Common Frequency Resource) to the Initial BWP (e.g., when the Configured MBS BWP/CFR is larger than the Initial BWP).
1. When the UE (100) stops/abandons MBS service reception e.g., last active MBS service that the UE (100) was receiving is stopped.
2. Required MBS service is abandoned by the wireless network (400) (e.g., suspended/deactivated or stopped).
3. Cell/area is changed so that MBS service is no longer supported
4. MCCH indicates removal or stopping of the MBS service
5. -SIB or MBS SIB provides the Configured MBS BWP/CFR, which is changed to less than or equal to Initial BWP In an embodiment, the UE (100) switches from the Initial BWP to the Configured MBS BWP (Bandwidth Part) or CFR (Common Frequency Resource) e.g., when the Configured MBS BWP/CFR is larger than the Initial BWP.
1. When the UE (100) starts MBS service reception.
2. Required MBS service is started/resumed/activated by the wireless network (400).
3. Cell/area is changed so that MBS service becomes supported or available.

4. MCCH change notification and/or MCCH indicates start of required service.
5. SIB or MBS SIB provides Configured MBS BWP/CFR which is changed to larger than initial BWP.
6. Service continuity during RRC state change to RRC_CONNECTED and out of RRC_CONNECTED. MBS broadcast reception can be continued on configured MBS CFR. (This overcomes the issues e.g., when RACH is performed on initial BWP, it may cause interruption due change of BWP/CFR intermittently. Similarly, during RRC state change out of RRC_CONNECTED, if UE starts using initial BWP, then there may be interruption and/or loss of MBS).

In an embodiment, the UE (100) continues to receive from Initial BWP, MCCH change notification, MCCH and the MBS service (e.g., MTCH), when Configured MBS BWP/CFR is smaller than Initial BWP and/or Configured MBS BWP/CFR is confined within Initial BWP.

In an embodiment, the UE (100) receives MCCH and/or MTCH from one or more MBS BWP or CFR configured. In order to support simultaneous SIB and/or paging reception, these MBS BWP or CFR may be confined within Initial BWP and/or have Initial BWP contained. In some cases, there may be partial or full overlapping between these MBS BWPs or CFRs as well. In case of full overlapping, UE (100) can monitor for the MBS BWP or CFR which is the largest. Otherwise, UE (100) may switch form one MBS BWP/CFR to another (e.g., in time domain or frequency domain) or may utilize multiple RF capability. The UE (100) can indicate its RF capability in the UE capability information message or UE assistance information message or interest indication message to the network entity.

In an embodiment, the UE (100) continues to receive multicast service in Idle or Inactive mode, when the network entity releases the UE (100) from the connected mode (e.g., due to congestion). For this purpose, as one approach, multicast services are received in Idle and/or Inactive mode in delivery mode 1 (i.e., keeping the same connected mode BWP and multicast PDCCH and/or PDSCH channels and skipping certain UE specific operations for HARQ/CSI feedback and configurations). This also implies the dedicated signaling mechanism in connected mode can be achieved by utilizing SIB/MCCH/paging based signaling. As another approach, multicast services are received in Idle and/or Inactive mode in delivery mode 2 (i.e., delivery mode for multicast service is switched from DM1 to DM2 and mechanism of DM2 mode of reception for multicast services is applied in Idle/Inactive mode). This also implies SIB, MCCH and paging approaches are used for receiving configuration for multicast services while in Idle/Inactive mode.

In an embodiment, the UE (100) continues to receive multicast service in Idle or Inactive mode, when the network entity releases the UE (100) from the Connected mode (e.g., due to congestion). At least one of the following actions may be performed:
1. PTP configuration is released for multicast service. PTP related RLC entity is released and MAC configuration is released. MAC entity may also be reset.
2. PTM configuration (or a subset of this which is relevant for Idle/Inactive) may be retained and continued in Idle or Inactive mode. E.g., HARQ feedback configuration may not be retained for Idle/Inactive mode, however, the UE (100) can avail HARQ retransmissions.
3. New configuration for Idle or Inactive mode for MBS service is provided to the UE (100) by the network entity through dedicated signalling (e.g., through RRC reconfiguration and/or RRC Releases and/or RRC Release with Suspend configuration).
4. New configuration for Idle and/or Inactive mode for MBS service is received by the UE (100) through broadcast signaling e.g., SIB, MCCH.
5. BWP configuration for MBS is changed from dedicated BWP to the Initial BWP or configured MBS BWP or CFR. Alternatively, the UE (100) can still continue with dedicated BWP for multicast service reception without actually being in Connected state.
6. BWP, search space, HARQ and DRX configuration for MCCH is obtained from MBS SIB and/or pre-configuration is provided by network entity to the UE (100) through the dedicated signalling.
7. DRX configuration for MBS service may or may not be changed for Idle/Inactive mode reception. That is, the UE (100) may also continue with the same PTM DRX configuration as was being used earlier in the Connected state
8. Paging configuration as applicable in Idle/Inactive mode is provided and applied to the UE (100).

In an embodiment, the UE (100) is triggered to receive multicast service in the idle mode or the inactive mode, among others, including at least one of the following:
1. When the network entity (200) releases the UE (100) from the connected mode (e.g., due to congestion) with an indication of continuation of MBS multicast service in Idle or Inactive mode. Indication can be provided to the UE (100) through RRC signalling like RRC Reconfiguration message and/or MAC signalling e.g., MAC CE and/or RRC Release and/or RRC Release with suspend configuration or NAS signalling.
2. When MCCH or paging or group paging in Idle or Inactive mode indicates availability and/or activation of multicast service, but the UE (100) is not able to switch to the Connected mode (e.g., due to congestion).

In an embodiment, the UE (100) continues to receive multicast service in Connected mode, when the UE (100) transits to the Connected mode (e.g., a new unicast service is started, congestion condition is alleviated, signal strength conditions are satisfied). An indication of continuation of MBS multicast service in Connected mode can be provided to the UE (100) through SIB, MCCH, paging or group paging. Alternatively, the UE (100) may autonomously decide on returning to the connected mode. For this purpose, the UE (100) initiate RRC connection request and/or RRC connection resume based on Idle or Inactive respectively. The UE (100) may also indicate the cause for connection establishment and/or resumption (i.e., continuing of multicast service). Further, a high access priority may be assigned to such UEs to ensure they can establish or resume the connection. At least one of the following actions may be performed on transitioning to the Connected mode:
1. PTM configuration, received in Idle/Inactive, is released for multicast service. PTM related RLC entity is released and MAC configuration is released. MAC entity may also be reset. Alternatively, same configuration is continued in connected mode (i.e., PTM configuration, used in Idle/Inactive, is continued for multicast service. PTM related RLC entity is continued and MAC configuration is continued. MAC entity is not reset)
2. BWP, search space, HARQ and DRX configuration for MCCH obtained from MBS SIB is also released for multicast service. (It is assumed that the UE (100) does not have broadcast MBS service). In case, the UE (100) was using same configuration in Idle/Inactive mode as that was for connected mode, the UE (100) is not required to release the configurations and continue with while transiting to connected mode 3. New configuration for multicast MBS service is provided to the UE (100) by network entity through dedicated signalling.
4. BWP configuration for MBS is changed from Initial BWP or configured MBS BWP or CFR to dedicated BWP. If BWP configuration being used in Idle/Inactive mode was that of dedicated BWP for connected mode, the UE (100) continues with same dedicated BWP while transiting to connected mode.

In an embodiment, the UE (100) receiving multicast services in Idle and/or Inactive mode is informed about the configuration (BWP, DRX, HARQ etc.) and/or service (stop, suspension, deactivation etc.) related changes to the multicast services by at least one of SIB/MBS SIB, MCCH, paging, PDCCH. These may be explicit configuration/service parameters and/or an indication of change. Based on this, the UE (100) may either modify the configuration or service parameters and/or transit to the connected mode (e.g., to avail the new configuration only or switching to connected mode for multicast service reception).

In an embodiment, as an example, the MCCH carries the explicit configuration and/or indication of change of the configuration/service for the multicast services for reception in Idle/Inactive mode. Based on explicit configuration, the UE (100) applies the new configuration and continues to receive multicast services in Idle/inactive mode. Based on change indication, the UE (100) transits to connected mode to avail new configuration. As another example, paging carries the indication of change of the configuration/service for the multicast services. Based on change indication, the UE (100) transits to connected mode to avail new configuration. Further, the UE (100) may return back or can be switched back by network entity to Idle/Inactive mode.

In an embodiment, the UE (100) continues to receive broadcast service in Idle or Inactive mode, when the network entity releases the UE (100) from Connected mode or data-InactivityTimer is expired or bwp-Inactivitytimer is expired, at least one of the following actions may be performed
1. PTM configuration received from MCCH is retained.
2. PTM RLC entity is retained, all other RLC entities are released.
3. MAC entity is retained and MAC configuration is retained for PTM and all other MAC configurations/timers are released.
4. Initial BWP and/or configured MBS BWP/CFR is retained. Any other BWP (e.g., dedicated BWP) is released.
5. HARQ buffer/process and configuration for PTM is retained. All other HARQ buffer/process are reset and HARQ configuration is released.
6. DRX configuration for PTM is retained. All other DRX configurations (e.g., PTP DRX or unicast DRX) except for Idle mode paging/DRX configuration are released.
7. MBS radio bearer for broadcast service is retained.

In an embodiment, the UE (100) continues to receive broadcast service in Connected mode, when the UE (100) transits from Idle or Inactive mode, by sending RRC Connection request or RRC Resume request to the network entity.
1. PTM configuration received from MCCH is retained.
2. PTM RLC entity is retained.
3. MAC entity is retained and MAC configuration is retained for PTM.
4. Initial BWP and/or configured MBS BWP/CFR is retained.
5. HARQ buffer/process and configuration for PTM is retained. DRX configuration for PTM is retained.
6. MBS radio bearer for broadcast service is retained.
7. The UE (100) performs Random access along with receiving broadcast service, provided random access resources and operation does not interrupt or limit broadcast service reception.
8. If active BWP in the Connected mode does not support MBS BWP/CFR for broadcast services, the UE (100) terminates the broadcast services.

In an embodiment, the UE (100) is switched to Idle and/or Inactive mode when DataInacitvityTimer or MBS-DataInactivityTimer expires in connected mode when the UE (100) is receiving MBS service.

In an embodiment, the UE (100) is switched to Idle and/or Inactive mode when DataInacitvityTimer or MBS-DataInactivityTimer expires in connected mode when the UE (100) is receiving MBS multicast service, only when multicast service is deactivated/suspended or discontinued by the network entity (200) or abandoned/stopped by UE (100).

In an embodiment, the UE (100) maintains a Data-InactivityTimer or MBSData-InactivityTimer in Idle and/or Inactive mode, when receiving MBS services. Timer is started or restarted when MBS service packet is received and/or MBS service is activated. When there is no reception of MBS service packets and the timer expires, the UE (100) abandons receiving the MBS service in Idle and/or Inactive mode. In an example, the MCCH modification period can be quite large (e.g., 5 ms, 10 ms or so) and it takes more time for the UE (100) to be notified of service suspension/deactivation through the MCCH. Further, the UE (100) may perform one or more of the following:
1. The UE (100) switches from the MBS BWP or CFR to Initial BWP (e.g., when this is the last MBS service and/or other MBS services can be received within or on Initial BWP).
2. The UE (100) sends MBS interest indication and attempts to move to RRC connected state.
3. The UE (100) prioritizes mobility (cell reselection from the cell) in order to receive MBS service.
4. The UE (100) notifies user about the unavailability/suspension/deactivation for the service.

In an embodiment, broadcast services and multicast services can be received together by the UE (100) (e.g., in connected mode, in idle/Inactive mode when broadcast and low QoS multicast services are received together). Further, Logical Channel Identity (LC ID) used for broadcast services configured through MCCH and LC ID used for (PTM) multicast services configured through dedicated signaling use different different/separate LC ID space. In another embodiment, LC ID space may be common for broadcast services configured through MCCH and LC ID used for (PTM) multicast services configured through dedicated signaling, however, network entity ensures there is no conflict or overlapping in usage (e.g., at least in given BWP and/or cell and/or PLMN). Whereas, PTP multicast services in connected mode may use the same LC ID space as with the DRBs.

In another embodiment, when there is PTP HARQ retransmission for PTM initial transmission, LC ID mapping information is provided so that the retransmitted PDUs are processed (e.g., soft combined, decoded) and appropriately routed to concerned PTM RLC entities.

FIG. 3 shows various hardware components of the UE (100), according to embodiments as disclosed herein. In an embodiment, the UE (100) includes a processor (110), a communicator (120), a memory (130), a MBS service controller (140), an on-demand MBS SIB reception controller (150), a broadcast MRB retention controller (160) and a multicast reception controller (170). The processor (110) is coupled with the communicator (120), the memory (130), the MBS service controller (140), the on-demand MBS SIB reception controller (150), the broadcast MRB retention controller (160) and the multicast reception controller (170).

In an embodiment, the MBS service controller (140) is configured to receive the MCCH configuration and the at least one parameter associated with the MCCH configuration in the SIB. The MCCH configuration includes the at least one of the PDCCH addressed to a MCCH-RNTI providing at least one of the time domain allocation and the frequency domain allocation for receiving a PDSCH channel carrying the MCCH information message. The at least one parameter can be, for example, but not limited to the MCCH offset, the MCCH first-slot, the MCCH duration, the MCCH repetition period, the MCCH-modification period, the resource configuration parameter for the MCCH, a configured MBS BWP, a CFR, a search space, a bandwidth for the MCCH and a bandwidth for the MTCH.

The MCCH configuration and the at least one parameter associated with the MCCH configuration in the SIB is received by applying the MBS SIB acquisition procedure. The MBS SIB acquisition procedure is applied when at least one of the UE (100) is powered on and the cell on which the UE (100) has camped is broadcasting the MBS SIB including the MCCH configuration, the cell selected is broadcasting the MBS SIB including the MCCH configuration during the cell selection, the cell reselected is broadcasting the MBS SIB including the MCCH configuration during the cell reselection, the target cell is broadcasting the MBS SIB including the MCCH configuration during the handover, the UE (100) is already receiving NR MBS services, the MBS SIB acquisition procedure is applied during at least one of the MCCH change indication, the NR MBS service activation, the NR MBS service resumption, the MBS activation by the user or a service layer, the change of the MBS service by the user or the service layer, the UE (100) interested services change, receiving the MBS SIB in response to dedicated SIB request in the connected mode, receiving the MBS SIB in response to random access as per si-RequestConfig in at least one of the idle mode and the inactive mode, receiving MBS SIB in response to a RRC system info request in at least one of an idle mode and an inactive mode.

Based on the MCCH configuration and the parameter associated with the MCCH configuration, the MBS service controller (140) configures the MCCH channel and receives a MCCH information message through the MCCH channel. Based on the MCCH information message, the MBS service controller (140) configures the at least one MTCH and receives the MBS service through the MTCH.

In an embodiment, the MBS service controller (140) is configured to utilize MCCH-RNTI for receiving a MCCH change notification information and a MCCH. The MBS service controller (140) is configured to acquire the MCCH in response to determining that the MCCH change notification information is indicated by the network entity (200). Alternately, the MBS service controller (140) is configured to use the stored MCCH in response to determining that the MCCH change notification information is not indicated by the network entity (200). The MCCH change notification information is carried by the first DCI bit and the second DCI bit, where the first DCI bit indicates the start of new MBS session and the second DCI bit indicates at least one of a MBS session configuration change, a MBS session stop and a change of neighbor cell information. The DCI of a PDCCH for the MCCH, addressed by MCCH-RNTI, carries change notification information in DCI bits, if the MCCH change notification information and the MCCH occurs in a same slot, wherein the same slot comprises a first slot for the MCCH duration.

In an embodiment, the MBS service controller (140) is configured to receive a SIB1 and determine whether the SIB1 comprises the Si-Scheduling information comprising the si-RequestConfig for a MBS SIB. The UE (100) receives the on-demand MBS SIB, when the UE (100) does not have a stored version of MBS SIB or the UE (100) have a stored version of MBS SIB which is not valid. The UE (100) acquires the requested SI message for the MBS SIB when an acknowledgement for a SI request is received from the lower layer. The UE (100) acquires the requested SI messages immediately when an acknowledgement for the RRCSystemInfoRequest message is received from the lower layer. The MBS service controller (140) is configured to trigger the lower layer to initiate a random access procedure on a normal uplink or a supplementary uplink using at least one of a PRACH preamble and a PRACH resource in the si-RequestConfig corresponding to a SI message that the UE (100) requires to receive the MBS SIB within a cell, and for which si-BroadcastStatus is set to "not Broadcasting" in response to determining that the SIB1 comprises the Si-Scheduling information comprising the si-RequestConfig for the MBS SIB. Alternately, the MBS service controller (140) is configured to initiate a transmission of a RRCSystemInfoRequest message in response to determining that the SIB1 does not comprise the Si-Scheduling information comprising the si-RequestConfig for the MBS SIB.

In an embodiment, the MBS service controller (140) is configured to detect a switching event for switching from one of the configured MBS BWP and the CFR to the initial BWP. The switching event corresponding to at least one of the UE (100) stopping MBS service reception, required MBS service abandoned by a network entity (200), a cell changed such that an MBS service is no longer supported, a RRC state change, a MCCH indicating removal or stopping of the MBS service, and a SIB or a MCCH providing the configured MBS BWP or the CFR, which is changed to less than or equal to the initial BWP. Based on the switching event, the MBS service controller (140) is configured to switch from one of the configured MBS BWP and the CFR to the initial BWP.

In an embodiment, the MBS service controller (140) is configured to determine that a RRC state is changed from a RRC connected state to at least one of a RRC inactive state and a RRC idle state. Further, the MBS service controller (140) is configured to determine whether the UE (100) has been receiving a MBS broadcast in the RRC connected state. In response to determining that the UE (100) has not been receiving the MBS broadcast in the RRC connected state, the MBS service controller (140) is configured to switch the UE (100) to an initial BWP in at least one of the RRC inactive state and the RRC idle state. In response to determining that the UE (100) has been receiving the MBS broadcast in the RRC connected state, the MBS service controller (140) is configured to determine whether one of a MBS BWP and a CFR for a broadcast reception is larger than an initial BWP.

Further, the UE (100) continues the MBS broadcast reception on one of the configured MBS BWP and the MBS CFR in the at least one of the RRC idle state and the RRC inactive state in response to determining that one of the MBS BWP and the CFR for broadcast reception is larger than the initial BWP. Alternately, the UE (100) switches to the initial BWP and the UE (100) continues the MBS broadcast reception in the initial BWP in the RRC idle state or the RRC inactive state in response to determining that the one of the MBS BWP and CFR for the broadcast reception is not larger than the initial BWP.

The MBS service controller (140) is configured to determine that a RRC state is changed from at least one of a RRC inactive state and a RRC idle state to a RRC connected state. Further, the MBS service controller (140) is configured to determine whether the UE (100) has been receiving a MBS broadcast in the at least one of the RRC inactive state and the RRC idle state. In response to determining that the UE (100) has not been receiving the MBS broadcast in the at least one of the RRC inactive state and the RRC idle state, the MBS service controller (140) is configured to switch the UE (100) into the RRC connected state and monitor as per a dedicated unicast BWP. In response to determining that the UE (100) has been receiving the MBS broadcast in the at least one of the RRC inactive state and the RRC idle state, the MBS service controller (140) is configured to determine whether one of the MBS BWP and the CFR for broadcast reception is larger than the initial BWP.

Further, the MBS service controller (140) is configured to perform the RA procedure on the initial BWP, where the UE (100) continues the MBS broadcast reception on one of the configured MBS BWP and the MBS CFR in response to determining that one of the MBS BWP and the CFR for broadcast reception is larger than the initial BWP. Alternately, the UE (100) performs the RA procedure on the initial BWP and the UE (100) continues the MBS broadcast reception in the initial BWP, the UE (100) monitors BWP and CFR or the initial BWP in response to determining that the MBS BWP or CFR for the broadcast reception is not larger than the initial BWP.

The MBS service controller (140) is configured to detect a switching event for switching from an initial BWP to one of a configured MBS BWP and a CFR. The switching event corresponds to the UE (100) starting the MBS service reception, the required MBS service started by the network entity (200), required MBS service resumed by the network entity (200), required MBS service activated by the network entity (200), a cell changed such that a MBS service becomes supported or available, a RRC state change, a MCCH change notification indicating start of required service, a MCCH indicating a start of required service and a SIB or MCCH providing the configured MBS BWP or the CFR which is changed to larger than the initial BWP. Based on the switching event, the MBS service controller (140) is configured to switch from the initial BWP to one of the configured MBS BWP and the CFR The MBS service controller (140) is configured to receive the at least one MBS service in the RRC connected state and report a MBS interest indication message to the network entity (200), wherein the MBS interest indication message comprises at least one of the MBS service list, the frequency list and the priority MBS service. Further, the MBS service controller (140) is configured to stop to receive the all MBS services from the network entity (200) and send the MBS interest indication message with an empty message to indicate a complete loss of interest in the MBS, and thereafter, the UE (100) stops reporting the MBS interest indication.

The MBS service controller (140) is configured to receive a broadcast signalling message and determine that a configured MBS BWP or a CFR is one of same as CORESET index 0, same as the initial BWP or larger than an initial BWP. Based on the determination, the MBS service controller (140) is configured to configure a start and length of PRBs for one of the MBS BWP or the CFR, when the MBS BWP or the CFR for a broadcast service reception is larger than the initial BWP. The broadcast signalling message may be the MBS SIB (e.g. SIBx). Further, the MBS service controller (140) is configured to receive the MBS service from the configured MBS BWP or CFR.

In an embodiment, the on-demand MBS SIB reception controller (150) is configured to determine whether the UE (100) is in a connected mode and has a stored valid version of MBS SIBs and the UE (100) requires to operate within a cell, or the UE (100) is in a connected mode and active BWP does not include or is not configured with a common search space and the UE (100) does not have stored valid version of MBS SIB or the UE (100) is in the connected mode and the active BWP includes or is configured with the common search space and the UE (100) does not have the stored valid version of the MBS SIB and the cell is broadcasting, or the UE (100) is in the connected mode and the active BWP includes or is configured with the common search space and the UE (100) does not have stored valid version of MBS SIB and the cell is NOT broadcasting. The on-demand MBS SIB reception controller (150) is configured to utilize the stored version of the MBS SIB(s) in response to determining the UE (100) is in the connected mode and has the stored valid version of the MBS SIBs.

Alternately, the on-demand MBS SIB reception controller (150) is configured to request the on-demand MBS SIB if the UE (100) is in the connected mode and the active BWP associated with the UE (100) does not include or not configured with the common search space for the MBS SIBs and the UE (100) does not have the valid stored version of MBS SIB. Alternately, the on-demand MBS SIB reception controller (150) is configured to request the on-demand MBS SIB and acquiring the SI containing the at least one required MBS SIB if the UE (100) is in the connected mode and the active BWP associated with the UE (100) includes or is configured with the common search space for the MBS SIB and the UE (100) does not have the valid stored version of the MBS SIB.

In an embodiment, the broadcast MRB retention controller (160) is configured to receive at least one MBS broadcast service, when the UE (100) is in one of a RRC connected state, a RRC idle state and a RRC inactive state. Further, the broadcast MRB retention controller (160) is configured to continue to receive the MBS broadcast service and retain the broadcast MRB when the UE (100) receives one of a RRC release and a RRC release with suspend configuration from the network entity (200) or a dataInactivityTimer timer is expired. Further, the broadcast MRB retention controller (160) is configured to continue to receive the MBS broadcast service and retain the broadcast MRB when the UE (100) receives one of a RRC setup and a RRC resume from a network entity (200). The broadcast MRB retention controller (160) is configured to perform at least one action based on the continuing to receive the MBS broadcast service and retain the broadcast MRB. The at least one action comprises retain a PTM configuration received from a MCCH, retain a PTM RLC entity for broadcast MRB, release all other RLC entities, retain MAC entity and MAC configuration for broadcast MRB, release all other MAC configurations, retain at least one of an initial BWP, a configured MBS BWP and a configured MBS CFR, release other BWP, retain DRX configuration and timers for PTM for MBS broadcast and retain HARQ buffer and configuration for PTM for MBS broadcast.

In an embodiment, the multicast reception controller (170) is configured to continue reception of at least one multicast service in the RRC inactive state when the network entity (200) releases the UE (100) from the RRC connected state and perform the action based on continuing reception of the at least one multicast service in the RRC inactive state. The at least one action comprises release a PTP configuration for the multicast service, release a PTP related RLC entity and MAC configuration, partially or fully reset a MAC entity, retain a PTM configuration for multicast in an inactive state, provide a configuration in an inactive state for the multicast service to the UE by a network entity through one of a broadcast signaling and/or dedicated signalling through at least one of a RRC reconfiguration, and a RRC release with suspend configuration, change a BWP configuration for the multicast from dedicated BWP to one of an initial BWP, configured MBS BWP and CFR, or continue with dedicated BWP for multicast service reception without actually being in a connected state, manage a DRX configuration for the multicast service reception in an inactive state.

In another embodiment, the multicast reception controller (170) is configured to receive at least one MBS multicast service, when the UE (100) is in a RRC connected state. Further, the multicast reception controller (170) is configured to receive one of combination of a reconfiguration message and a RRC release message with a suspend configuration from a network entity (200). Further, the multicast reception controller (170) is configured to switch the RRC connected state to the RRC inactive state based on receiving the one of the combinations of the reconfiguration message and the RRC release message with the suspend configuration from the network entity (200). Further, the multicast reception controller (170) is configured to continue receive the at least one MBS multicast service in the RRC inactive state through one of a first delivery mode and a second delivery mode. Further, the multicast reception controller (170) is configured to receive a dedicated signalling in the RRC connected mode for receiving the configuration of at least one MBS multicast service upon determining at least one associated configuration change in the RRC inactive state through at least one of a SIB, a MCCH, and a paging message. Alternately, the multicast reception controller (170) is configured to receive the notification signalling and the configuration signalling in the RRC inactive state through at least one of a SIB, a MCCH, and a paging message.

In an embodiment, the at least one of the reconfiguration message and the RRC release message with suspend configuration is received upon detecting a congestion at the network entity (200), wherein the first delivery mode keeps a same connected mode BWP and multicast PDCCH and PDSCH channels and skips at least one UE specific operation for at least one of a Hybrid Automatic Repeat Request (HARQ) and Channel Status Information (CSI) feedback and configurations and receives the multicast services.

In an embodiment, the least one of the reconfiguration message and the RRC release message with suspend configuration is received upon detecting a congestion at the network entity (200), wherein the second delivery mode releases connected mode BWP and multicast PDCCH and PDSCH channels and at least one UE specific operation for at least one of a Hybrid Automatic Repeat Request (HARQ) and Channel Status Information (CSI) feedback and configurations, wherein, the UE (100) configures as per new configurations for a RRC inactive state and receives the multicast services.

In an embodiment, the multicast reception controller (170) is configured to continue receive at least one MBS multicast service in the RRC inactive state and send a RRC resume request to the network entity (200). Further, the multicast reception controller (170) is configured to perform at least one action in response to sending the RRC resume request to the network entity (200). Further, the multicast reception controller (170) is configured to continue receive at least one MBS multicast service in the RRC connected state. In an embodiment, the at least one action comprises continue a PTM configuration, used in the RRC inactive state, for a multicast service, continue a PTM related RLC entity and a MAC configuration, not resetting a MAC entity, receive a configuration for multicast MBS service from a network entity through a dedicated signalling, and continue the UE (100) with same dedicated BWP while transiting to the RRC connected state.

In another embodiment, the at least one action comprises release a PTM configuration for the multicast service used in the RRC inactive state, release a PTM related RLC entity, release a MAC configuration, reset a MAC entity, release at least one of BWP, search space, HARQ, DRX configuration obtained from SIB or MCCH for the multicast service, receive a configuration for multicast service through a dedicated signaling, change BWP configuration for MBS from an initial BWP or configured MBS BWP, or CFR to dedicated BWP, if the BWP configuration being used in the inactive mode, and the continues with same dedicated BWP, while transiting to the RRC connected state.

The UE (100) continues receiving the at least one MBS multicast service in the RRC connected state, wherein the UE (100) switches from a RRC inactive state to the RRC connected state, when at least one of the UE (100) receives an indication for receiving the MBS multicast service in the RRC connected state through at least one of a SIB, a MCCH, and a paging message in the RRC inactive state and the UE (100) autonomously decides to return to the RRC connected state.

The MBS service controller (140) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

The on-demand MBS SIB reception controller (150) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

The broadcast MRB retention controller (160) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

The multicast reception controller (170) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the pluralities of modules/controller may be implemented through the AI model using the data driven controller. The data driven controller can be a ML model-based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 3 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

FIG. 4 shows various hardware components of the network entity (200), according to embodiments as disclosed herein. In an embodiment, the network entity (200) includes a processor (210), a communicator (220), a memory (230) and a MBS service controller (240). The processor (210) is coupled with the communicator (220), the memory (230) and the MBS service controller (240). The MBS service controller is configured to send a MCCH signalling message to the UE (100). The MCCH signalling message comprises the list of DRX scheduling configurations and the list of MBS service configurations. Further, the MBS service controller is configured to map the DRX scheduling configuration with the PTM service configuration based on the index of the DRX scheduling configuration provided in the PTM service configuration in the MCCH signalling message.

The MBS service controller (240) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the pluralities of modules/controller may be implemented through the AI model using the data driven controller. The data driven controller can be a ML model-based controller and AI model based controller. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 6 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

FIG. 5 and FIG. 6 are flow charts (500 and 600) illustrating a method for handling the MBS service in the wireless network (400), according to embodiments as disclosed herein.

Referring to the FIG. 5, the operations (502-510) are performed by the terminal. According to an aspect of the present disclosure, the operations (502-510) are handled by the MBS service controller (140). At 502, the method includes receiving the MCCH configuration and the at least one parameter associated with the MCCH configuration in the SIB. At 504, the method includes configuring the MCCH channel based on the MCCH configuration and the parameter associated with the MCCH configuration. At 506, the method includes receiving the MCCH information message through the MCCH channel. At 508, the method includes configuring the MTCH based on the MCCH information message. At 510, the method includes receiving the MBS service through the MTCH.

Referring to the FIG. 6, the operations (602-606) are performed by the terminal. According to an aspect of the present disclosure, the operations (602-606) are handled by the MBS service controller (140). At 602, the method includes utilizing the MCCH-RNTI for receiving the MCCH change notification information and the MCCH. At 604, the method includes acquiring the MCCH in response to determining that the MCCH change notification information is indicated by the network entity (200). At 606, the method includes using the stored MCCH in response to determining that the MCCH change notification information is not indicated by the network entity (200).

FIG. 7 is a flow chart (700) illustrating a method for handling an on-demand MBS SIB reception in the wireless network (400), according to embodiments as disclosed herein.

Referring to the FIG. 7, the operations (702-708) are performed by the terminal. According to an aspect of the present disclosure, the operations (702-708) are handled by the MBS service controller (140). At 702, the method includes receiving the SIB1. At 704, the method includes determining whether the SIB1 comprises the Si-Scheduling information comprising the si-RequestConfig for the MBS SIB. At 706, the method includes initiating the transmission of a RRCSystemInfoRequest message in response to determining that the SIB1 does not comprise the Si-Scheduling information comprising the si-RequestConfig for the MBS SIB. At 708, the method includes triggering the lower layer to initiate the random access procedure on the normal uplink or the supplementary uplink using at least one of the PRACH preamble and the PRACH resource in the si-RequestConfig corresponding to the SI message that the UE (100) requires to receive MBS SIB within a cell, and for which siBroadcastStatus is set to "not Broadcasting" in response to determining that the SIB1 comprises the Si-Scheduling information comprising the si-RequestConfig for the MBS SIB.

FIG. 8 is a flow chart (800) illustrating a method for handling the on-demand MBS SIB reception in the wireless network (400), according to embodiments as disclosed herein.

Referring to the FIG. 8, the operations (802-808) are performed by the terminal. According to an aspect of the present disclosure, the operations (802-808) are handled by the MBS service controller (140). At 802, the method includes determining whether the UE (100) is in the connected mode and has the stored valid version of MBS SIBs and the UE (100) requires to operate within the cell, or the UE (100) in a connected mode and the active BWP does not include or is not configured with the common search space and the UE (100) does not have stored valid version of MBS SIB or the UE (100) is in the connected mode and the active BWP includes or is configured with the common search space and the UE (100) does not have the stored valid version of the MBS SIB and the cell is broadcasting, or the UE (100) is in the connected mode and the active BWP includes or is configured with the common search space and the UE (100) does not have stored valid version of MBS SIB and the cell is NOT broadcasting.

At 804, the method includes utilizing the stored version of the MBS SIB(s) in response to determining the UE (100) is in the connected mode and has the stored valid version of the MBS SIBs. At 806, the method includes requesting the on-demand MBS SIB if the UE (100) is in the connected mode and the active BWP associated with the UE (100) does not include or not configured with the common search space for the MBS SIBs and the UE (100) does not have the valid stored version of MBS SIB. At 808, the method includes requesting the on-demand MBS SIB and acquiring the SI containing the at least one required MBS SIB if the UE (100) is in the connected mode and the active BWP associated with the UE (100) includes or is configured with the common search space for the MBS SIB and the UE (100) does not have the valid stored version of the MBS SIB.

FIG. 9a is a flow chart (900a) illustrating a method for handling a MBS BWP switching in the wireless network (400), according to embodiments as disclosed herein. The operations (902a-906a) are performed by the terminal. According to an aspect of the present disclosure, the operations (902a-906a) are handled by the MBS service controller (140). At 902a, the method includes receiving a broadcast signalling message and determining that the configured MBS BWP or the CFR is one of same as CORESET index 0, same as the initial BWP or larger than an initial BWP, wherein the broadcast signalling message is a MBS system information block (SIB). At 904*a*, the method includes configuring a start and length of physical resource blocks (PRBs) for one of the MBS BWP or the CFR, when the MBS BWP or the CFR for a broadcast service reception is larger than the initial BWP based on the determination. At 906*a*, the method includes receiving the MBS service from the configured MBS BWP or the CFR.

FIG. 9*b* and FIG. 10 are flow charts (900*b* and 1000) illustrating methods for method for handling a switching from one of the MBS BWP and the CFR to the initial BWP in the wireless network (400), according to embodiments as disclosed herein.

Referring to the FIG. 9*b*, the operations (902*b* and 904*b*) are performed by the terminal. According to an aspect of the present disclosure, the operations (902*b* and 904*b*) are handled by the MBS service controller (140). At 902*b*, the method includes detecting the switching event for switching from one of the configured MBS BWP and the CFR to the Initial BWP. At 904*b*, the method includes switching from one of the configured MBS BWP and the CFR to the Initial BWP based on the switching event.

Referring to the FIG. 10, the operations (1002-1012) are performed by the terminal. According to an aspect of the present disclosure, the operations (1002-1012) are handled by the MBS service controller (140). At 1002, the method includes determining that the RRC state is changed from the RRC connected state to at least one of the RRC inactive state and the RRC idle state. At 1004, the method includes determining whether the UE (100) has been receiving the MBS broadcast in the RRC connected state. If the UE (100) has not been receiving the MBS broadcast in the RRC connected state then, at 1006, the method includes switching the UE (100) to the initial BWP in at least one of the RRC inactive state and the RRC idle state. If the UE (100) has been receiving the MBS broadcast in the RRC connected state then, at 1008, the method includes determining whether the MBS BWP or the CFR for the broadcast reception is larger than the initial BWP. If the MBS BWP or the CFR for the broadcast reception is larger than the initial BWP then at 1010, the UE (100) continues the MBS broadcast reception on the configured MBS BWP or the MBS CFR in the at least one of the RRC idle state and the RRC inactive state. If the MBS BWP or the CFR for the broadcast reception is not larger than the initial BWP then at 1012, the UE (100) switches to the initial BWP and the UE (100) continues the MBS broadcast reception in the initial BWP in the RRC idle state or the RRC inactive state.

FIG. 11 and FIG. 12 are flow charts (1100 and 1200) illustrating methods for handling the switching from the initial BWP to one of the MBS BWP and the CFR in the wireless network (400), according to embodiments as disclosed herein.

Referring to the FIG. 11, the operations (1102-1112) are performed by the terminal. According to an aspect of the present disclosure, the operations (1102-1112) are handled by the MBS service controller (140). At 1102, the method includes determining that the RRC state is changed from at least one of the RRC inactive state and the RRC idle state to the RRC connected state. At 1104, the method includes determining whether the UE (100) has been receiving the MBS broadcast in the at least one of the RRC inactive state and the RRC idle state. If the UE has not been receiving the MBS broadcast in the at least one of the RRC inactive state and the RRC idle state then, at 1106, the method includes switching the UE (100) into the RRC connected state and monitor as per a dedicated unicast BWP. If the UE (100) has been receiving the MBS broadcast in the at least one of the RRC inactive state and the RRC idle state then, at 1108, the method includes determining whether the MBS BWP or the CFR for broadcast reception is larger than the initial BWP. If the MBS BWP or the CFR for broadcast reception is larger than the initial BWP then, at 1110, the method includes perform the RA procedure on the initial BWP, wherein the UE (100) continues the MBS broadcast reception on the configured MBS BWP or the MBS CFR. If the MBS BWP or a CFR for broadcast reception is not larger than an initial BWP then, at 1112, the method includes performing the RA procedure on the initial BWP and the UE (100) continues the MBS broadcast reception in the initial BWP. The UE (100) monitors BWP/CFR or the initial BWP.

Referring to the FIG. 12, the operations (1202-1204) are performed by the terminal. According to an aspect of the present disclosure, the operations (1202 and 1204) are handled by the MBS service controller (140). At 1202, the method includes detecting the switching event for switching from the initial BWP to one of the configured MBS BWP and the CFR. At 1204, the method includes switch from the initial BWP to one of the configured MBS BWP and the CFR based on the switching event.

FIG. 13 is a flow chart (1300) illustrating a method for handling the DRX configuration in the wireless network (400), according to embodiments as disclosed herein. The operations (1302 and 1304) are performed by the network entity (e.g., base station). According to an aspect of the present disclosure, the operations (1302 and 1304) are handled by the MBS service controller (240).

At 1302, the method includes sending the MCCH signalling message to the UE (100). The MCCH signalling message includes at least one of the list of DRX scheduling configurations and the list of MBS service configurations. At 1304, the method includes mapping the DRX scheduling configuration with the PTM service configuration based on the index of the DRX scheduling configuration provided in the PTM service configuration in the MCCH signalling message.

FIG. 14 is a flow chart (1400) illustrating a method for handling a signaling of MBS interest indication in the wireless network (400), according to embodiments as disclosed herein.

Referring to the FIG. 14, the operations (1402-1408) are performed by the terminal. According to an aspect of the present disclosure, the operations (1402-1408) are handled by the MBS service controller (140). At 1402, the method includes receiving the at least one MBS service in the RRC connected state. At 1404, the method includes reporting the MBS interest indication message to the network entity (200). The MBS interest indication message comprises the MBS service list, the frequency list and the priority MBS service. At 1406, the method includes stopping to receive the all MBS services from the network entity (200). At 1408, the method includes sending the MBS interest indication message with the empty message to indicate the complete loss of interest in the MBS and thereafter the UE (100) stops reporting the MBS interest indication.

FIG. 15 is a flow chart (1500) illustrating a method for handling broadcast MRB retention in the wireless network (400), according to embodiments as disclosed herein.

Referring to the FIG. 15, the operations (1502-1508) are performed by the terminal. According to an aspect of the present disclosure, the operations (1502-1508) are handled by the MBS service controller (140). At 1502, the method includes receiving the MBS broadcast service, when the UE (100) is in one of the RRC connected state, the RRC idle state and the RRC inactive state. At 1504, the method includes continue to receive the MBS broadcast service and retaining the broadcast MRB when the UE (100) receives one of the RRC release and a RRC release with suspend configuration from the network entity (200) or the dataInactivityTimer timer is expired. At 1506, the method includes continue to receive the MBS broadcast service and retaining the broadcast MRB when the UE (100) receives one of the RRC setup and a RRC resume from the network entity (200). At 1508, the method includes performing at least one action based on the continuing to receive the MBS broadcast service and retain the broadcast MRB. The action can be, for example, but not limited to retain a PTM configuration received from a MCCH, retain a PTM RLC entity for broadcast MRB, release all other RLC entities, retain MAC entity and MAC configuration for broadcast MRB, release all other MAC configurations, retain an initial BWP, a configured MBS BWP and a configured MBS CFR, release other BWP, retain DRX configuration and timers for PTM for MBS broadcast and retain HARQ buffer and configuration for PTM for MBS broadcast.

FIG. 16 to FIG. 18 are flow charts (1600-1800) illustrating a method for handling multicast reception in the wireless network (400), according to embodiments as disclosed herein.

Referring to the FIG. 16, the operations (1602 and 1604) are performed by the terminal. According to an aspect of the present disclosure, the operations (1602 and 1604) are handled by the MBS service controller (140). At 1602, the method includes continue reception of at least one multicast service in the RRC inactive state when the network entity (200) releases the UE (100) from the RRC connected state. At 1604, the method includes performing at least one action based on continuing reception of the at least one multicast service in the RRC inactive state, wherein the at least one action comprises release a PTP configuration for the multicast service, release a PTP related RLC entity and MAC configuration, partially or fully reset a MAC entity, retain a PTM configuration for multicast in an inactive state, provide a configuration in an inactive state for the multicast service to the UE by a network entity through one of a broadcast signaling and/or dedicated signalling through at least one of a RRC reconfiguration, and a RRC release with suspend configuration, change a BWP configuration for the multicast from dedicated BWP to one of an initial BWP, configured MBS BWP and CFR, or continue with dedicated BWP for multicast service reception without actually being in a connected state, manage a DRX configuration for the multicast service reception in an inactive state.

Referring to the FIG. 17, the operations (1702-171) are performed by the terminal. According to an aspect of the present disclosure, the operations (1702-1712) are handled by the MBS service controller (140). At 1702, the method includes receiving the MBS multicast service, when the UE (100) is in the RRC connected state. At 1704, the method includes receiving one of combination of a reconfiguration message and a RRC release message with a suspend configuration from the network entity (200). At 1706, the method includes switching the RRC connected state to the RRC inactive state based on receiving the one of the combination of the reconfiguration message and the RRC release message with the suspend configuration from the network entity (200). At 1708, the method includes continue receiving the at least one MBS multicast service in the RRC inactive state through one of the first delivery mode and the second delivery mode. At 1710, the method includes receiving a dedicated signalling in the RRC connected mode for receiving configuration of the at least one MBS multicast service upon determining at least one associated configuration change in the RRC inactive state through at least one of the SIB, the MCCH, and the paging message. At 1712, the method includes receive a notification signalling and a configuration signalling in the RRC inactive state through at least one of the SIB, the MCCH, and the paging message.

Referring to the FIG. 18, the operations (1802-1808) are performed by the terminal. According to an aspect of the present disclosure, the operations (1802-1808) are handled by the MBS service controller (140). At 1802, the method includes receiving the at least one MBS multicast service in the RRC inactive state. At 1804, the method includes sending the RRC resume request to the network entity (200). At 1806, the method includes performing at least one action in response to sending the RRC resume request to the network entity (200), wherein the at least one action comprises continue a PTM configuration, used in the RRC inactive state, for a multicast service, continue a PTM related RLC entity and a MAC configuration, not resetting a MAC entity, receive a configuration for multicast MBS service from a network entity through a dedicated signalling, and continue the UE with same dedicated BWP while transiting to the RRC connected state, wherein the at least one action comprises release a PTM configuration for the multicast service used in the RRC inactive state, release a PTM related RLC entity, release a MAC configuration, reset a MAC entity, release at least one of BWP, search space, HARQ, DRX configuration obtained from SIB or MCCH for the multicast service, receive a configuration for multicast service through a dedicated signaling, change BWP configuration for MBS from an initial BWP or configured MBS BWP, or CFR to dedicated BWP, if the BWP configuration being used in an idle mode or the inactive mode, and the continues with same dedicated BWP, while transiting RRC connected state. At 1808, the method includes continue receiving the at least one MBS multicast service in the RRC connected state.

The various actions, acts, blocks, steps, or the like in the flow charts (500 to 1800) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements can be at least one of a hardware device, or a combination of hardware device and software module.

The principal object of the embodiments herein is to disclose efficient and effective methods and a UE for MCCH configuration and operation and handling idle/inactive mode operation for NR Multicast Broadcast Services (MBS) for New Radio (NR) in a 5th generation Radio Access Technology (RAT).

Another object of the embodiments herein is to disclose how to configure MCCH, what should be structure of MCCH, what all contents MCCH can carry and in general, to specify operational details for Idle and/or Inactive mode.

Another object of the embodiments herein is to disclose an on-demand MBS SIB reception.

Another object of the embodiments herein is to disclose a grouping of DRX configurations in a MCCH and indexing based DRX configuration mapping to MBS service configuration.

Another object of the embodiments herein is to disclose MCCH change notification scheduling by MCCH PDCCH DCI and same RNTI as used for MCCH.

Another object of the embodiments herein is to disclose MCCH change notification for "change of MCCH—other than start of new session", by a new DCI bit.

Another object of the embodiments herein is to disclose signalling interest indication with 0 interested services.

Another object of the embodiments herein is to disclose Switching across MBS BWP/CFR and Initial BWP.

Another object of the embodiments herein is to disclose retention of broadcast MRB across the RRC state transition.

Accordingly, the embodiments herein provide methods for handling a MBS service in a wireless network. The method includes receiving, by a UE, a MBS Control Channel (MCCH) configuration and at least one parameter associated with the MCCH configuration in a System Information block (SIB). Further, the method includes configuring, by the UE, a MCCH channel based on the MCCH configuration and the parameter associated with the MCCH configuration. Further, the method includes receiving, by the UE, a MCCH information message through the MCCH channel. Further, the method includes configuring, by the UE, at least one MBS traffic channel (MTCH) based on the MCCH information message. Further, the method includes receiving, by the UE, the MBS service through the MTCH.

In an embodiment, the SIB includes at least one of a SIB1, an existing SIB and a dedicated SIB for a new radio (NR) MBS purpose, wherein the dedicated SIB comprises a MBS SIB.

In an embodiment, the MCCH includes at least one of a Physical Downlink Control Channel (PDCCH) addressed to a MCCH-Radio Network Temporary Identifier (RNTI) providing at least one of a time domain allocation and a frequency domain allocation for receiving a Physical Downlink Shared Channel (PDSCH) channel carrying a MCCH information message.

In an embodiment, the at least one parameter comprises at least one of a MCCH offset, a MCCH first-slot, a MCCH duration, a MCCH repetition period, a MCCH-modification period, a resource configuration parameter for the MCCH, a configured MBS bandwidth part (BWP), a common frequency resource (CFR), a search space, a bandwidth for the MCCH and a bandwidth for the MTCH.

In an embodiment, the MCCH offset indicates a radio frame offset for a MCCH scheduling, wherein the MCCH first slot indicates a first slot in a sub-frame starting from where the MCCH is scheduled, wherein the MCCH duration indicates a duration in number of slots where the MCCH is scheduled, wherein the MCCH repetition period indicates an interval for the MCCH within a modification period, where the MCCH is repeated, wherein the MCCH modification period indicates an interval for the MCCH by which updated contents for the MCCH is transmitted, wherein configured BWP or CFR for MCCH and MTCH is one of same as CORESET index 0, same as the initial BWP or larger than the initial BWP with providing start and length of physical resource blocks (PRBs) used for the MCCH and the MTCH.

In an embodiment, receiving, by the UE, the MCCH configuration and the at least one parameter associated with the MCCH configuration in the SIB includes applying, by the UE, a MBS SIB acquisition procedure, and receiving, by the UE, the MCCH configuration and the at least one parameter associated with the MCCH configuration in the SIB upon applying the MBS SIB acquisition procedure.

In an embodiment, the MBS SIB acquisition procedure is applied when at least one of the UE is powered on and a cell on which UE has camped is broadcasting a MBS SIB including the MCCH configuration, a cell selected is broadcasting the MBS SIB including the MCCH configuration during a cell selection, a cell reselected is broadcasting the MBS SIB including the MCCH configuration during a cell reselection, a target cell is broadcasting the MBS SIB including the MCCH configuration during a handover, the UE is already receiving NR MBS services, the MBS SIB acquisition procedure is applied during at least one of a MCCH change indication, a NR MBS service activation, a NR MBS service resumption, the MBS activation by a user or a service layer, a change of the MBS service by a user or a service layer, the UE interested services change, receiving the MBS SIB in response to dedicated SIB request in a connected mode, receiving the MBS SIB in response to random access as per si-RequestConfig in at least one of an idle mode and an inactive mode, receiving MBS SIB in response to a radio resource control (RRC) system info request in at least one of an idle mode and an inactive mode.

Accordingly, the embodiments herein provide methods for handling a MBS service in a wireless network. The method includes utilizing, by a UE, a MCCH-RNTI for receiving a MCCH change notification information and a MCCH. Further, the method includes performing, by the UE, one of acquiring the MCCH in response to determining that the MCCH change notification information is indicated by a network entity, and using, by the UE, a stored MCCH in response to determining that the MCCH change notification information is not indicated by the network entity.

In an embodiment, the MCCH change notification information is carried by a first Downlink Control Information (DCI) bit and a second DCI bit. The first DCI bit when set to 1 indicates a start of new MBS session and the second DCI bit when set to 1 indicates at least one of a MBS session configuration change, a MBS session stop and a change of neighbor cell information. The first DCI bit when set to 0 indicates that there is no start of new MBS session and the second DCI bit when set to 0 indicates that there is no MBS session configuration change and there is no MBS session stop and there is no change of neighbor cell information.

In an embodiment, DCI of a Physical Downlink Control Channel (PDCCH) for the MCCH carries change notification information in DCI bits, if the MCCH change notification information and the MCCH occurs in a same slot; wherein the same slot comprises a first slot for the MCCH duration.

Accordingly, the embodiments herein provide methods for handling an on-demand MBS SIB reception in a wireless network. The method includes receiving, by a UE, a SIB1 and determining, by the UE, whether a SIB1 comprises Si-Scheduling information comprising a si-RequestConfig for the MBS SIB. In an embodiment, the method includes triggering a lower layer to initiate a random access procedure on a normal uplink or a supplementary uplink using at least one of a physical random access channel (PRACH) preamble and a PRACH resource in the si-RequestConfig corresponding to a system information (SI) message that the UE requires to receive MBS SIB within a cell, and for which si-BroadcastStatus is set to "not Broadcasting" in response to determining that the SIB1 comprises the Si-Scheduling information comprising the si-RequestConfig for the MBS SIB. In another embodiment, the method includes initiating a transmission of a RRCSystemInfoRequest message in response to determining that the SIB1 does not comprise the Si-Scheduling information comprising the si-RequestConfig for the MBS SIB.

In an embodiment, the UE receives the on-demand MBS SIB, when the UE does not have a stored version of MBS SIB or the UE have a stored version of MBS SIB which is not valid.

In an embodiment, the UE acquires the requested SI (system information) message for the MBS SIB when an acknowledgement for a SI request is received from the lower layer.

In an embodiment, the UE acquires the requested SI messages immediately when an acknowledgement for the RRCSystemInfoRequest message is received from the lower layer.

Accordingly, the embodiments herein provide methods for handling an on-demand MBS SIB reception in a wireless network. The method includes determining, by a UE, whether the UE is in a connected mode and has a stored valid version of MBS SIBs and the UE requires to operate within a cell, or the UE in a connected mode and active BWP does not include or is not configured with a common search space and the UE does not have stored valid version of MBS SIB, or the UE is in the connected mode and the active BWP includes or is configured with the common search space and the UE does not have the stored valid version of the MBS SIB and the cell is broadcasting, or the UE is in the connected mode and the active BWP includes or is configured with the common search space and the UE does not have stored valid version of MBS SIB and the cell is NOT broadcasting. In an embodiment, the method includes utilizing, by the UE, the stored version of the MBS SIB(s) in response to determining the UE is in the connected mode and has the stored valid version of the MBS SIBs. In another embodiment, the method includes requesting, by the UE, an on-demand MBS SIB if the UE is in the connected mode and the active BWP associated with the UE does not include or not configured with the common search space for the MBS SIBs and the UE does not have the valid stored version of MBS SIB. In another embodiment, the method includes requesting, by the UE, the on-demand MBS SIB and acquiring the SI containing the at least one required MBS SIB if the UE is in the connected mode and the active BWP associated with the UE includes or is configured with the common search space for the MBS SIB and the UE does not have the valid stored version of the MBS SIB.

In an embodiment, the UE requests for the on-demand MBS SIB(s) contained in a SI message based on an mbsSI-SchedulingInfo in the stored SIB1, wherein the UE initiates transmission of a DedicatedSIBRequest message and starts a timer with a timer value set to a onDemandSIB-Request-ProhibitTimer, if the onDemandSIB-Request is configured and the timer is not running.

In an embodiment, the UE requesting the on-demand MBS SIB and acquiring the SI message is by one of the following: acquiring the SI messages, wherein MBS SIBs are contained in the SI messages based on the si-SchedulingInfo in the stored SIB1, in which a si-BroadcastStatus is set to "broadcasting"; and requesting the on-demand MBS SIBs contained in the SI messages based on the si-SchedulingInfo in the stored SIB1, in which si-BroadcastStatus is set to "not Broadcasting", and wherein the UE initiates transmission of the DedicatedSIBRequest message, starts the timer with the timer value set to the onDemandSIB-RequestProhibitTimer, acquires the requested SI messages corresponding to the requested MBS SIB(s) if onDemand-SIB-Request is configured and the timer is not running, wherein the UE acquires the requested SI message comprising the MBS SIB.

In an embodiment, the UE includes the on-demand request for at least one of SIB(s), positioning SIBs and MBS SIBs in a DedicatedSIBRequest message, wherein the UE sets required MBS SIB(s) in a SIB-ReqInfo field of requestedSIB-List within an onDemandSIB-RequestList of the DedicatedSIBRequest message.

Accordingly, the embodiments herein provide methods for handling a MBS BWP switching in a wireless network. The method includes receiving, by the UE, a broadcast signalling message and determining, by the UE, that a configured MBS BWP or a CFR is one of same as CORESET index 0, same as the initial BWP or larger than an initial BWP, wherein the broadcast signalling message is a MBS system information block (SIB). Further, the method includes configuring, by the UE, a start and length of physical resource blocks (PRBs) for one of the MBS BWP or the CFR, when the MBS BWP or the CFR for a broadcast service reception is larger than the initial BWP based on the determination. Further the method includes receiving, by the UE, a MBS service from the configured MBS BWP or CFR.

Accordingly, the embodiments herein provide methods for handling a switching from one of a MBS BWP and a CFR to an Initial BWP in a wireless network. The method includes detecting, by a UE a switching event for switching from one of the configured MBS BWP and the CFR to an Initial BWP. Further, the method includes switching, by the UE, from one of the configured MBS BWP and the CFR to the Initial BWP based on the switching event.

In an embodiment, the switching event corresponding to at least one of the UE stopping MBS service reception, required MBS service abandoned by a network entity, a cell changed such that a MBS service is no longer supported, a RRC state change, a MCCH indicating removal or stopping of the MBS service, and a SIB or a MCCH providing the configured MBS BWP or the CFR, which is changed to less than or equal to the initial BWP.

Accordingly, the embodiments herein provide methods for handling a switching from one of a MBS BWP and a CFR to an Initial BWP in a wireless network. The method includes determining, by the UE, that a RRC state is changed from a RRC connected state to at least one of a RRC inactive state and a RRC idle state. Further, the method includes determining, by the UE, whether the UE has been receiving a MBS broadcast in the RRC connected state. Further, the method includes performing, by the UE, one of; switching the UE to an initial BWP in at least one of the RRC inactive state and the RRC idle state in response to determining that the UE has not been receiving the MBS broadcast in the RRC connected state; and determining whether the MBS BWP or the CFR for the broadcast reception is larger than the initial BWP in response to determining that the UE has been receiving the MBS broadcast in the RRC connected state.

In an embodiment, the UE continues the MBS broadcast reception on the configured MBS BWP or the MBS CFR in the at least one of the RRC idle state and the RRC inactive state in response to determining that the MBS BWP or the CFR for broadcast reception is larger than the initial BWP.

In an embodiment, the UE switches to the initial BWP and the UE continues the MBS broadcast reception in the initial BWP in the RRC idle state or the RRC inactive state in response to determining that the MBS BWP or CFR for broadcast reception is not larger than the initial BWP.

Accordingly, the embodiments herein provide methods for handling a switching from one of a MBS BWP and a CFR to an Initial BWP in a wireless network. The method includes determining, by the UE, that a RRC state is changed from at least one of a RRC inactive state and a RRC idle state to a RRC connected state. Further, the method includes determining, by the UE, whether the UE has been receiving a MBS broadcast in the at least one of the RRC inactive state and the RRC idle state. In an embodiment, the method includes switching the UE into a RRC connected state and monitor as per a dedicated unicast BWP in response to determining that the UE has not been receiving the MBS broadcast in the at least one of the RRC inactive state and the RRC idle state. In another embodiment, the method includes determining whether a MBS BWP or a CFR for broadcast reception is larger than an initial BWP in response to determining that the UE has been receiving the MBS broadcast in the at least one of the RRC inactive state and the RRC idle state.

In an embodiment, the UE performs a RA procedure on the initial BWP, wherein the UE continues the MBS broadcast reception on the configured MBS BWP or the MBS CFR in response to determining that the MBS BWP or CFR for broadcast reception is larger than the initial BWP.

In an embodiment, the UE performs the RA procedure on the initial BWP and UE continues the MBS broadcast reception in the initial BWP, the UE monitors BWP/CFR or the initial BWP in response to determining that the MBS BWP or CFR for broadcast reception is not larger than the initial BWP.

Accordingly, the embodiments herein provide a method for handling a switching from an Initial BWP to one of a MBS BWP and a CFR in a wireless network. The method includes detecting, by a UE, a switching event for switching from an initial BWP to one of the configured MBS BWP and the CFR. Further, the method includes switching, by the UE, from the initial BWP to one of the configured MBS BWP and the CFR based on the switching event.

In an embodiment, the switching event corresponds to the UE starting a MBS service reception, a required MBS service started by a network entity, required MBS service resumed by the network entity, required MBS service activated by the network entity, a cell changed such that MBS service becomes supported or available, a RRC state change, a MCCH change notification indicating start of required service, a MCCH indicating a start of required service and a SIB or MCCH providing the configured MBS BWP or the CFR which is changed to larger than the initial BWP.

Accordingly, the embodiments herein provide methods for handling a discontinuous reception (DRX) configuration in a wireless network. The method includes sending, by a network entity, a MCCH signalling message to a UE. The MCCH signalling message includes at least one of a list of DRX scheduling configurations and a list of MBS service configurations. Further, the method includes mapping, by the network entity, the DRX scheduling configuration with a point-to-multipoint (PTM) service configuration based on an index of the DRX scheduling configuration provided in the PTM service configuration in the MCCH signalling message.

Accordingly, the embodiments herein provide methods for handling a signaling of MBS interest indication in a wireless network. The method includes receiving, by a UE, at least one MBS service in a radio resource control (RRC) connected state. Further, the method includes reporting, by the UE, a MBS interest indication message to a network entity. The MBS interest indication message comprises at least one of a MBS service list, a frequency list and a priority MBS service. Further, the method includes stopping, by the UE, to receive the all MBS services from the network entity. Further, the method includes sending, by the UE, the MBS interest indication message with an empty message to indicate a complete loss of interest in the MBS and thereafter, the UE stops reporting the MBS interest indication.

Accordingly, the embodiments herein provide methods for handling broadcast MBS Radio Bearer (MRB) retention in a wireless network. The method includes receiving, by a UE, at least one MBS broadcast service, when the UE is in one of a RRC connected state, a RRC idle state and a RRC inactive state. Further, the method includes continuing, by the UE, to receive a MBS broadcast service and retain the broadcast MRB when the UE receives one of a RRC release and a RRC release with suspend configuration from a network entity or a dataInactivityTimer timer is expired. Further, the method includes continuing, by the UE, to receive a MBS broadcast service and retain the broadcast MRB when the UE (100) receives one of a RRC setup and a RRC resume from a network entity. Further, the method includes performing, by the UE, at least one action based on the continuing to receive the MBS broadcast service and retain the broadcast MRB.

In an embodiment, the at least one action comprises retain a PTM configuration received from a MCCH, retain a PTM RLC entity for broadcast MRB, release all other RLC entities, retain MAC entity and MAC configuration for broadcast MRB, release all other MAC configurations, retain at least one of an initial BWP, a configured MBS BWP and a configured MBS CFR, release other BWP, retain DRX configuration and timers for PTM for MBS broadcast and retain HARQ buffer and configuration for PTM for MBS broadcast.

Accordingly, the embodiments herein provide methods for handling multicast reception in a wireless network. The method includes continuing, by a UE, reception of at least one multicast service in a RRC inactive state when a network entity releases the UE from a RRC connected state. Further, the method includes performing, by the UE, at least one action based on continuing reception of the at least one multicast service in the RRC inactive state.

In an embodiment, the at least one action comprises release a PTP configuration for the multicast service, release a PTP related RLC entity and MAC configuration, partially or fully reset a MAC entity, retain a PTM configuration for multicast in an inactive state, provide a configuration in an inactive state for the multicast service to the UE by a network entity through one of a broadcast signaling and/or dedicated signalling through at least one of a RRC reconfiguration, and a RRC release with suspend configuration, change a BWP configuration for the multicast from dedicated BWP to one of an initial BWP, configured MBS BWP and CFR, or continue with dedicated BWP for multicast service reception without actually being in a connected state, manage a DRX configuration for the multicast service reception in an inactive state.

Accordingly, the embodiments herein provide methods for handling multicast reception in a wireless network. The method includes receiving, by a UE, at least one MBS multicast service, when the UE is in a RRC connected state. Further, the method includes receiving, by the UE, one of combination of a reconfiguration message and a RRC release message with a suspend configuration from a network entity. Further, the method includes switching, by the UE, the RRC connected state to a RRC inactive state based on receiving the one of the combination of the reconfiguration message and the RRC release message with the suspend configuration from the network entity. Further, the method includes continue receiving, by the UE, the at least one MBS multicast service in the RRC inactive state through one of a first delivery mode and a second delivery mode. In an embodiment, the method includes receiving a dedicated signalling in the RRC connected mode for receiving the configuration of at least one MBS multicast service upon determining at least one associated configuration change in the RRC inactive state through at least one of a SIB, a MCCH, and a paging message. In another embodiment, the method includes receiving a notification signalling and a configuration signalling in the RRC inactive state through at least one of a SIB, a MCCH, and a paging message.

In an embodiment, at least one of the reconfiguration message and the RRC release message with suspend configuration is received upon detecting a congestion at the network entity, wherein the first delivery mode keeps a same connected mode BWP and multicast PDCCH and PDSCH channels and skips at least one UE specific operation for at least one of a Hybrid Automatic Repeat Request (HARQ) and Channel Status Information (CSI) feedback and configurations and receives the multicast services.

In an embodiment, at least one of the reconfiguration message and the RRC release message with suspend configuration is received upon detecting a congestion at the network entity, wherein the second delivery mode releases connected mode BWP and multicast PDCCH and PDSCH channels and at least one UE specific operation for at least one of a Hybrid Automatic Repeat Request (HARQ) and Channel Status Information (CSI) feedback and configurations, wherein, the UE configures as per new configurations for a RRC inactive state and receives the multicast services.

Accordingly, the embodiments herein provide methods for handling multicast reception in a wireless network. The method includes continue receiving, by a User Equipment (UE), at least one MBS multicast service in a RRC inactive state. Further, the method includes sending, by the UE, a RRC resume request to a network entity and performing, by the UE, at least one action in response to sending the RRC resume request to the network entity. Further, the method includes continue receiving, by the UE, at least one MBS multicast service in a RRC connected state.

In an embodiment, the UE continues receiving the at least one MBS multicast service in the RRC connected state, wherein at least one of the UE switches from a RRC inactive state to the RRC connected state, when at least one of the UE receives an indication for receiving the MBS multicast service in the RRC connected state through at least one of a SIB, a MCCH, and a paging message in the RRC inactive state and the UE autonomously decides to return to the RRC connected state.

In an embodiment, the at least one action comprises continue a PTM configuration, used in the RRC inactive state, for a multicast service, continue a PTM related RLC entity and a MAC configuration, not resetting a MAC entity, receive a configuration for multicast MBS service from a network entity through a dedicated signalling, and continue the UE with same dedicated BWP while transiting to the RRC connected state.

In an embodiment, the at least one action comprises release a PTM configuration for the multicast service used in the RRC inactive state, release a PTM related RLC entity, release a MAC configuration, reset a MAC entity, release at least one of BWP, search space, HARQ, DRX configuration obtained from SIB or MCCH for the multicast service, receive a configuration for multicast service through a dedicated signaling, change BWP configuration for MBS from an initial BWP or configured MBS BWP, or CFR to dedicated BWP, if the BWP configuration being used in the inactive mode, and the continues with same dedicated BWP, while transiting to the RRC connected state.

Accordingly, the embodiments herein provide a UE for handling a MBS service in a wireless network. The UE includes a MBS service controller coupled with a processor and a memory. The MBS service controller is configured to receive a MCCH configuration and at least one parameter associated with the MCCH configuration in a SIB. Further, the MBS service controller configures a MCCH channel based on the MCCH configuration and the parameter associated with the MCCH configuration. Further, the MBS service controller is configured to receive a MCCH information message through the MCCH channel. Further, the MBS service controller configures at least one MTCH based on the MCCH information message. Further, the MBS service controller is configured to receive the MBS service through the MTCH.

Accordingly, the embodiments herein provide a UE for handling a MBS service in a wireless network. The UE includes a MBS service controller coupled with a processor and a memory. Further, the MBS service controller is configured to utilize MCCH-RNTI for receiving a MCCH change notification information and a MCCH. In an embodiment, the MBS service controller is configured to acquire the MCCH in response to determining that the MCCH change notification information is indicated by a network entity. In another embodiment, the MBS service controller is configured to use a stored MCCH in response to determining that the MCCH change notification information is not indicated by the network entity.

Accordingly, the embodiments herein provide a UE for handling an on-demand MBS SIB reception in a wireless network. The UE includes a MBS service controller coupled with a processor and a memory. Further, the MBS service controller is configured to receive a SIB1 and determine whether a SIB1 comprises Si-Scheduling information comprising a si-RequestConfig for the MBS SIB. In an embodiment, the MBS service controller is configured to trigger a lower layer to initiate a random access procedure on a normal uplink or a supplementary uplink using at least one of a physical random access channel (PRACH) preamble and a PRACH resource in the si-RequestConfig corresponding to a system information (SI) message that the UE requires to receive MBS SIB within a cell, and for which si-BroadcastStatus is set to "not Broadcasting" in response to determining that the SIB1 comprises the Si-Scheduling information comprising the si-RequestConfig for the MBS SIB. Further, the MBS service controller is configured to initiate a transmission of a RRCSystemInfoRequest message in response to determining that the SIB1 does not comprise the Si-Scheduling information comprising the si-RequestConfig for the MBS SIB.

Accordingly, the embodiments herein provide a UE for handling an on-demand MBS SIB reception in a wireless network. The UE includes a MBS service controller coupled with a processor and a memory. The MBS service controller is configured to determine whether the UE is in a connected mode and has a stored valid version of MBS SIBs and the UE requires to operate within a cell, or the UE is in a connected mode and active BWP does not include or is not configured with a common search space and the UE does not have stored valid version of MBS SIB or the UE is in the connected mode and the active BWP includes or is configured with the common search space and the UE does not have the stored valid version of the MBS SIB and the cell is broadcasting, or the UE is in the connected mode and the active BWP includes or is configured with the common search space and the UE does not have stored valid version of MBS SIB and the cell is NOT broadcasting. In an embodiment, the MBS service controller is configured to utilize the stored version of the MBS SIB(s) in response to determining the UE is in the connected mode and has the stored valid version of the MBS SIBs. In another embodiment, the MBS service controller is configured to request an on-demand MBS SIB if the UE is in the connected mode and the active BWP associated with the UE does not include or not configured with the common search space for the MBS SIBs and the UE does not have the valid stored version of MBS SIB. In an embodiment, the MBS service controller is configured to request the on-demand MBS SIB and acquiring the SI containing the at least one required MBS SIB if the UE is in the connected mode and the active BWP associated with the UE includes or is configured with the common search space for the MBS SIB and the UE does not have the valid stored version of the MBS SIB.

Accordingly, the embodiments herein provide a UE for handling a MBS BWP switching in a wireless network. The UE includes a MBS service controller coupled with a processor and a memory. The MBS service controller is configured to receive a broadcast signalling message and determine that a configured MBS BWP or a CFR is one of same as CORESET index 0, same as the initial BWP or larger than an initial BWP, wherein the broadcast signalling message is a MBS system information block (SIB). Further, the MBS service controller is configured to configure a start and length of physical resource blocks (PRBs) for one of the MBS BWP or the CFR, when the MBS BWP or the CFR for a broadcast service reception is larger than the initial BWP based on the determination and receive a MBS service from the configured MBS BWP or CFR.

Accordingly, the embodiments herein provide a UE for handling a switching from one of a MBS BWP and a CFR to an Initial BWP in a wireless network. The UE includes a MBS service controller coupled with a processor and a memory. The MBS service controller is configured to detect a switching event for switching from one of the configured MBS BWP and a CFR to an Initial BWP. Further, the MBS service controller is configured to switch from one of the configured MBS BWP and the CFR to the Initial BWP based on the switching event.

Accordingly, the embodiments herein provide a UE for handling a switching from one of a MBS BWP and a CFR to an Initial BWP in a wireless network. The UE includes a MBS service controller coupled with a processor and a memory. The MBS service controller is configured to determine that a RRC state is changed from a RRC connected state to at least one of a RRC inactive state and a RRC idle state and determine whether the UE has been receiving a MBS broadcast in the RRC connected state. In an embodiment, further, the MBS service controller is configured to switch the UE to an initial BWP in at least one of the RRC inactive state and the RRC idle state in response to determining that the UE has not been receiving the MBS broadcast in the RRC connected state. In an embodiment, further, the MBS service controller is configured to determine whether the MBS BWP or the CFR for the broadcast reception is larger than the initial BWP in response to determining that the UE has been receiving the MBS broadcast in the RRC connected state.

Accordingly, the embodiments herein provide a UE for handling a switching from one of a MBS BWP and a CFR to an Initial BWP in a wireless network. The UE includes a MBS service controller coupled with a processor and a memory. The MBS service controller is configured to determine that a RRC state is changed from at least one of a RRC inactive state and a RRC idle state to a RRC connected state. Further, the MBS service controller is configured to determine whether the UE has been receiving a MBS broadcast in the at least one of the RRC inactive state and the RRC idle state. In an embodiment, the MBS service controller is configured to switch the UE into RRC connected state and monitor as per a dedicated unicast BWP in response to determining that the UE has not been receiving the MBS broadcast in the at least one of the RRC inactive state and the RRC idle state. In another embodiment, the MBS service controller is configured to determine whether a MBS BWP or a CFR for broadcast reception is larger than an initial BWP in response to determining that the UE has been receiving the MBS broadcast in the at least one of the RRC inactive state and the RRC idle state.

Accordingly, the embodiments herein provide a UE for handling a switching from an initial BWP to one of a MBS BWP and a CFR in a wireless network. The UE includes a MBS service controller coupled with a processor and a memory. The MBS service controller is configured to detect a switching event for switching from an initial BWP to one of a configured MBS BWP and the CFR. The MBS service controller is configured to switch from the initial BWP to one of the configured MBS BWP and the CFR based on the switching event.

Accordingly, the embodiments herein provide a network entity for handling a DRX configuration in a wireless network. The network entity includes a MBS service controller coupled with a processor and a memory. The MBS service controller is configured to send a MCCH signalling message to a UE. The MCCH signalling message comprises at least one of a list of DRX scheduling configurations and a list of MBS service configurations. The MBS service controller is configured to map the DRX scheduling configuration with a point-to-multipoint (PTM) service configuration based on an index of the DRX scheduling configuration provided in the PTM service configuration in the MCCH signalling message.

Accordingly, the embodiments herein provide a UE for handling a signaling of MBS interest indication in a wireless network. The UE includes a MBS service controller coupled with a processor and a memory. The MBS service controller is configured to receive at least one MBS service in a RRC connected state. Further, the MBS service controller is configured to report a MBS interest indication message to a network entity. The MBS interest indication message comprises at least one of a MBS service list, a frequency list and a priority MBS service. Further, the MBS service controller is configured to stop to receive the all MBS services from the network entity. The MBS service controller is configured to send the MBS interest indication message with an empty message to indicate a complete loss of interest in the MBS and thereafter, the UE stops reporting the MBS interest indication.

Accordingly, the embodiments herein provide a UE for handling broadcast MRB retention in a wireless network. The UE includes a MBS service controller coupled with a processor and a memory. The MBS service controller is configured to receive at least one MBS broadcast service, when the UE is in one of a RRC connected state, a RRC idle state and a RRC inactive state. Further, the MBS service controller is configured to continue to receive a MBS broadcast service and retain the broadcast MRB when the UE receives one of a RRC release and a RRC release with suspend configuration from a network entity or a dataInactivityTimer timer is expired. Further, the MBS service controller is configured to continue to receive a MBS broadcast service and retain the broadcast MRB when the UE receives one of a RRC setup and a RRC resume from a network entity. Further, the MBS service controller is configured to perform at least one action based on the continuing to receive the MBS broadcast service and retain the broadcast MRB.

Accordingly, the embodiments herein provide a UE for handling multicast reception in a wireless network. The UE includes a MBS service controller coupled with a processor and a memory. The MBS service controller is configured to continue reception of at least one multicast service in a RRC inactive state when a network entity releases the UE from a RRC connected state; and perform at least one action based on continuing reception of the at least one multicast service in the RRC inactive state.

Accordingly, the embodiments herein provide a UE for handling multicast reception in a wireless network. The UE includes a MBS service controller coupled with a processor and a memory. The MBS service controller is configured to receive at least one MBS multicast service, when the UE is in a RRC connected state. Further, the MBS service controller is configured to receive one of a combination of a reconfiguration message and a RRC release message with a suspend configuration from a network entity. Further, the MBS service controller is configured to switch the RRC connected state to a RRC inactive state based on receiving the one of the combinations of the reconfiguration message and the RRC release message with the suspend configuration from the network entity. Further, the MBS service controller is configured to continue receive the at least one MBS multicast service in the RRC inactive state through one of a first delivery mode and a second delivery mode. Further, the MBS service controller is configured to perform one of: receive a dedicated signalling in the RRC connected mode for receiving the configuration of at least one MBS multicast service upon determining at least one associated configuration change in the RRC inactive state through at least one of a SIB, a MCCH, and a paging message, and receive a notification signalling and a configuration signalling in the RRC inactive state through at least one of a SIB, a MCCH, and a paging message.

Accordingly, the embodiments herein provide a UE for handling multicast reception in a wireless network. The UE includes a MBS service controller coupled with a processor and a memory. The MBS service controller is configured to continue receive at least one MBS multicast service in a RRC inactive state. Further, the MBS service controller is configured to send a RRC resume request to a network entity. Further, the MBS service controller is configured to perform at least one action in response to sending the RRC resume request to the network entity. Further, the MBS service controller is configured to continue receive at least one MBS multicast service in a RRC connected state.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

The invention claimed is:

1. A method performed by a terminal in a wireless communication system, the method comprising:
    receiving, from a base station, a multicast/broadcast service (MBS) broadcast configuration message on an MBS control channel (MCCH), the MBS broadcast configuration message including a list of MBS session information and a list of discontinuous reception (DRX) configuration information for a point to multi-point (PTM) transmission; and
    identifying an index of DRX configuration information for the PTM transmission corresponding to an MBS session identity included in the list of the MBS session information, based on the MBS broadcast configuration message.

2. The method of claim 1, wherein a mapping relation between the index of the DRX configuration information for the PTM transmission and the MBS session identity is included in the MBS broadcast configuration message.

3. The method of claim 1, further comprising:
    receiving downlink control information (DCI) including an MCCH change notification, on a physical downlink control channel (PDCCH) scrambled by MCCH-radio network temporary identifier (RNTI), in case that MCCH information is changed; and
    obtaining updated MCCH information from a slot in which the MCCH change notification is received.

4. The method of claim 3, wherein the MCCH change notification carries a 2-bit bitmap,
    wherein, in case that a most significant bit (MSB) in the 2-bit bitmap is set to 1, the MSB indicates a start of an mbs session, and
    wherein, in case that a least significant bit (LSB) in the 2-bit bitmap is set to 1, the LSB indicates a modification of MCCH information other than a change caused by start of a new mbs service.

5. The method of claim 1, further comprising:
    receiving a system information block (SIB) to acquire an MCCH configuration including information on a common frequency resource (CFR).

6. The method of claim 1, further comprising:
    releasing all radio bearers except for an MBS radio bearer (MRB), in case that a predetermined condition is satisfied,
    wherein the predetermined condition comprises a radio resource control (RRC) state of the terminal changed from a connected mode to an idle mode, based on a reception of a RRC release message or an expiration of a data inactivity timer.

7. The method of claim 5, wherein the information on the CFR includes information indicating a starting physical resource block (PRB) and a number of PRBs of the CFR used for the MCCH and a multicast traffic channel (MTCH) reception, and wherein the information indicating the starting PRB and the number of PRBs of the CFR used for the MCCH and the MTCH reception includes one of:
first information indicating that the CFR has a same location and a same size as configured for an initial bandwidth part (BWP) configured in an SIB1, or
second information configuring the CFR with a bandwidth that is larger than the bandwidth for the initial BWP configured in the SIB1.

8. The method of claim 5, wherein the CFR has a same location and a same size as a coreset0, if information indicating a starting physical resource block (PRB) and a number of PRBs of the CFR used for the MCCH and a multicast traffic channel (MTCH) reception is absent.

9. A terminal in a wireless communication system, the terminal comprising:
a transceiver; and
at least one processor configured to:
receive, from a base station via the transceiver, a multicast/broadcast service (MBS) broadcast configuration message on an MBS control channel (MCCH), the MBS broadcast configuration message including a list of MBS session information and a list of discontinuous reception (DRX) configuration information for a point to multipoint (PTM) transmission, and
identify an index of DRX configuration information for the PTM transmission corresponding to an MBS session identity included in the list of the MBS session information, based on the MBS broadcast configuration message.

10. The terminal of claim 9, wherein a mapping relation between the index of the DRX configuration information for the PTM transmission and the MBS session identity is included in the MBS broadcast configuration message.

11. The terminal of claim 9, wherein the at least one processor is further configured to:
receive, via the transceiver, downlink control information (DCI) including an MCCH change notification, on a physical downlink control channel (PDCCH) scrambled by MCCH-radio network temporary identifier (RNTI), in case that MCCH information is changed, and
obtain updated MCCH information from a slot in which the MCCH change notification is received.

12. The terminal of claim 11, wherein the MCCH change notification carries a 2-bit bitmap,
wherein, in case that a most significant bit (MSB) in the 2-bit bitmap is set to 1, the MSB indicates a start of an mbs session, and
wherein, in case that a least significant bit (LSB) in the 2-bit bitmap is set to 1, the LSB indicates a modification of MCCH information other than a change caused by start of a new mbs service.

13. The terminal of claim 9, wherein the at least one processor is further configured to:
receive, via the transceiver, a system information block (SIB) to acquire an MCCH configuration including information on a common frequency resource (CFR).

14. The terminal of claim 9, wherein the at least one processor is further configured to release all radio bearers except for an MBS radio bearer (MRB), in case that a predetermined condition is satisfied,
wherein the predetermined condition comprises a radio resource control (RRC) state of the terminal changed from a connected mode to an idle mode, based on a reception of an RRC release message or an expiration of a data inactivity timer.

15. The terminal of claim 13, wherein the information on the CFR includes information indicating a starting physical resource block (PRB) and a number of PRBs of the CFR used for the MCCH and a multicast traffic channel (MTCH) reception, and
wherein the information indicating the starting PRB and the number of PRBs of the CFR used for the MCCH and the MTCH reception includes one of:
first information indicating that the CFR has a same location and a same size as configured for an initial bandwidth part (BWP) configured in an SIB1, or
second information configuring the CFR with a bandwidth that is larger than the bandwidth for the initial BWP configured in the SIB1.

16. The method of claim 13, wherein the CFR has a same location and a same size as a coreset0, if information indicating a starting physical resource block (PRB) and a number of PRBs of the CFR used for the MCCH and a multicast traffic channel (MTCH) reception is absent.

* * * * *